US006985714B2

(12) United States Patent
Akiyama et al.

(10) Patent No.: US 6,985,714 B2
(45) Date of Patent: Jan. 10, 2006

(54) COMMUNICATION SYSTEM, COMMUNICATION TERMINAL AND COMMUNICATION METHOD

(75) Inventors: Keiji Akiyama, Tokyo (JP); Satoshi Konya, Kanagawa (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 10/298,528

(22) Filed: Nov. 19, 2002

(65) Prior Publication Data

US 2003/0129978 A1 Jul. 10, 2003

(30) Foreign Application Priority Data

Nov. 27, 2001 (JP) ............................ 2001-360412
May 22, 2002 (JP) ............................ 2002-148227

(51) Int. Cl.
*H04M 9/00* (2006.01)

(52) U.S. Cl. ................ 455/402; 455/552.1; 455/426.1; 455/445; 340/310.01

(58) Field of Classification Search ................ 455/445, 455/552.1, 426.1, 402, 422.1, 452.1; 370/351, 370/333, 338; 340/310.01, 538
See application file for complete search history.

(56) References Cited

U.S. PATENT DOCUMENTS 5,428,668 A * 6/1995 Dent et al. ............... 455/452.1
5,533,101 A * 7/1996 Miyagawa .................. 455/572
5,839,075 A * 11/1998 Haartsen et al. ............ 455/450
6,052,595 A * 4/2000 Schellinger et al. ........ 455/450
6,151,500 A * 11/2000 Cardina et al. .......... 455/435.2
6,167,278 A * 12/2000 Nilssen ....................... 455/462
6,246,750 B1 * 6/2001 Ehreth ....................... 379/56.2
6,246,868 B1 * 6/2001 Bullock et al. ............. 455/402
6,404,773 B1 * 6/2002 Williams et al. ............ 370/463
6,573,826 B2 * 6/2003 Pan ............................ 455/402
6,704,301 B2 * 3/2004 Chari et al. ................. 370/351
6,735,448 B1 * 5/2004 Krishnamurthy et al. ... 455/522
6,759,946 B2 * 7/2004 Sahinoglu et al. ..... 340/310.11
6,804,532 B1 * 10/2004 Moon et al. ............. 455/552.1
6,804,536 B1 * 10/2004 Bultman ..................... 455/557
6,856,799 B1 * 2/2005 Ritter ......................... 455/402
6,933,835 B2 * 8/2005 Kline ......................... 398/116
2002/0011923 A1 * 1/2002 Cunningham et al. . 340/310.01
2002/0022467 A1 * 2/2002 Matsui ....................... 455/402
2002/0113689 A1 * 8/2002 Gehlot et al. .......... 340/310.01
2002/0164991 A1 * 11/2002 Arazi et al. ................. 455/450
2002/0168959 A1 * 11/2002 Noguchi et al. ............ 455/405
2003/0040316 A1 * 2/2003 Stanforth et al. ........... 455/445

* cited by examiner

*Primary Examiner*—William Trost
*Assistant Examiner*—Sharad Rampuria
(74) *Attorney, Agent, or Firm*—Oblon, Spivak, McClelland, Maier & Neustadt, P.C.

(57) ABSTRACT

From an electric pole outside to a cordless handset inside a building/facility, a communication line is established via an electric power line. At this point, it is judged whether or not electric power line communication is possible, and if electric power line communication is possible, the communication line between the cordless handset and a base unit is switched to an electric power line communication system, and a communication line is formed via an optical fiber cable from the electric power line. By measuring the communication quality levels of all lines of the wireless and electric power lines, the communication line having the highest communication quality level may be selected.

28 Claims, 21 Drawing Sheets

FIG. 12

| COMMUNICATION MODE (COMMUNICATION SYSTEM AND TRANSMISSION RATE) | AVERAGE VALUE OF THROUGHPUT SHIFT (Mbps) | INITIAL VALUE OF THROUGHPUT (Mbps) |
|---|---|---|
| WIRELESS LAN 6Mbps | 4.3 | 4.0 |
| WIRELESS LAN 9Mbps | 6.0 | 5.0 |
| WIRELESS LAN 12Mbps | 9.1 | 7.0 |
| WIRELESS LAN 18Mbps | 11.8 | 9.0 |
| WIRELESS LAN 24Mbps | 7.2 | 12.0 |
| WIRELESS LAN 36Mbps | 5.3 | 19.0 |
| ELECTRIC POWER LINE 6Mbps | 3.4 | 3.0 |
| ELECTRIC POWER LINE 12Mbps | 8.6 | 8.0 |
| ELECTRIC POWER LINE 20Mbps | 13.3 | 13.0 |
| ELECTRIC POWER LINE 36Mbps | 12.0 | 17.0 |

FIG. 14

| COMMUNICATION MODE (COMMUNICATION SYSTEM AND TRANSMISSION RATE) | AVERAGE VALUE OF RELATIVE NOISE LEVEL SHIFT (dB) | INITIAL VALUE OF NOISE LEVEL (dBm) | REFERENCE NOISE VALUE (dBm) |
|---|---|---|---|
| WIRELESS LAN 6Mbps | 4 | −88 | −97 |
| WIRELESS LAN 9Mbps | 2 | −89 | −96 |
| WIRELESS LAN 12Mbps | −2 | −88 | −94 |
| WIRELESS LAN 18Mbps | 1 | −88 | −92 |
| WIRELESS LAN 24Mbps | 3 | −87 | −89 |
| WIRELESS LAN 36Mbps | 2 | −84 | −85 |
| ELECTRIC POWER LINE 6Mbps | 0 | −67 | −75 |
| ELECTRIC POWER LINE 12Mbps | −1 | −69 | −74 |
| ELECTRIC POWER LINE 20Mbps | 0 | −69 | −72 |
| ELECTRIC POWER LINE 36Mbps | 2 | −70 | −70 |

FIG. 16

| COMMUNICATION MODE (COMMUNICATION SYSTEM AND TRANSMISSION RATE) | AVERAGE VALUE OF RELATIVE DELAY SPREAD SHIFT (nsec) | INITIAL VALUE OF DELAY SPREAD (nsec) | REFERENCE DELAY SPREAD VALUE (nsec) |
|---|---|---|---|
| WIRELESS LAN 6Mbps | 4.0 | 11.0 | 6.0 |
| WIRELESS LAN 9Mbps | 2.6 | 6.0 | 5.0 |
| WIRELESS LAN 12Mbps | 1.6 | 5.2 | 4.0 |
| WIRELESS LAN 18Mbps | 9.9 | 4.0 | 3.0 |
| WIRELESS LAN 24Mbps | 3.3 | 2.0 | 2.0 |
| WIRELESS LAN 36Mbps | 5.7 | 1.1 | 1.0 |
| ELECTRIC POWER LINE 6Mbps | 5.2 | 10.0 | 4.0 |
| ELECTRIC POWER LINE 12Mbps | 1.3 | 5.0 | 3.0 |
| ELECTRIC POWER LINE 20Mbps | 2.9 | 3.0 | 2.0 |
| ELECTRIC POWER LINE 36Mbps | 2.1 | 1.0 | 1.0 |

FIG. 18

| COMMUNICATION MODE (COMMUNICATION SYSTEM AND TRANSMISSION RATE) | DIP LEVEL (NUMBER OF DIP POINTS) | REFERENCE VALUE (dBm/WIDTH kHz) |
|---|---|---|
| WIRELESS LAN 6Mbps | 4 | -87/200 |
| WIRELESS LAN 9Mbps | 2 | -86/200 |
| WIRELESS LAN 12Mbps | 1 | -84/200 |
| WIRELESS LAN 18Mbps | 0 | -82/200 |
| WIRELESS LAN 24Mbps | 2 | -79/200 |
| WIRELESS LAN 36Mbps | 6 | -75/200 |
| ELECTRIC POWER LINE 6Mbps | 1 | -65/180 |
| ELECTRIC POWER LINE 12Mbps | 2 | -64/180 |
| ELECTRIC POWER LINE 20Mbps | 3 | -62/180 |
| ELECTRIC POWER LINE 36Mbps | 2 | -60/180 |

FIG. 20

| COMMUNICATION MODE (COMMUNICATION SYSTEM AND TRANSMISSION RATE) | AVERAGE VALUE OF PER SHIFT | INITIAL VALUE OF PER |
|---|---|---|
| WIRELESS LAN 6Mbps | $1.33 \times 10^{-3}$ | $6.0 \times 10^{-4}$ |
| WIRELESS LAN 9Mbps | $1.91 \times 10^{-3}$ | $2.0 \times 10^{-4}$ |
| WIRELESS LAN 12Mbps | $6.51 \times 10^{-3}$ | $1.1 \times 10^{-4}$ |
| WIRELESS LAN 18Mbps | $3.75 \times 10^{-2}$ | $5.0 \times 10^{-5}$ |
| WIRELESS LAN 24Mbps | $4.26 \times 10^{-2}$ | $1.0 \times 10^{-5}$ |
| WIRELESS LAN 36Mbps | $9.37 \times 10^{-2}$ | $1.1 \times 10^{-6}$ |
| ELECTRIC POWER LINE 6Mbps | $1.40 \times 10^{-3}$ | $5.2 \times 10^{-4}$ |
| ELECTRIC POWER LINE 12Mbps | $5.92 \times 10^{-3}$ | $1.0 \times 10^{-4}$ |
| ELECTRIC POWER LINE 20Mbps | $4.11 \times 10^{-2}$ | $1.5 \times 10^{-5}$ |
| ELECTRIC POWER LINE 36Mbps | $1.26 \times 10^{-1}$ | $1.0 \times 10^{-6}$ |

FIG. 21

| COMMUNICATION MODE (COMMUNICATION SYSTEM AND TRANSMISSION RATE) | AVERAGE VALUE OF BER SHIFT | INITIAL VALUE OF BER |
|---|---|---|
| WIRELESS LAN 6Mbps | $3.14 \times 10^{-8}$ | $1.0 \times 10^{-7}$ |
| WIRELESS LAN 9Mbps | $9.11 \times 10^{-8}$ | $6.0 \times 10^{-8}$ |
| WIRELESS LAN 12Mbps | $2.71 \times 10^{-7}$ | $5.2 \times 10^{-8}$ |
| WIRELESS LAN 18Mbps | $5.56 \times 10^{-7}$ | $2.0 \times 10^{-8}$ |
| WIRELESS LAN 24Mbps | $4.62 \times 10^{-6}$ | $1.0 \times 10^{-8}$ |
| WIRELESS LAN 36Mbps | $8.03 \times 10^{-5}$ | $1.1 \times 10^{-9}$ |
| ELECTRIC POWER LINE 6Mbps | $3.01 \times 10^{-8}$ | $1.0 \times 10^{-7}$ |
| ELECTRIC POWER LINE 12Mbps | $5.98 \times 10^{-7}$ | $5.0 \times 10^{-8}$ |
| ELECTRIC POWER LINE 20Mbps | $9.66 \times 10^{-6}$ | $1.5 \times 10^{-8}$ |
| ELECTRIC POWER LINE 36Mbps | $8.19 \times 10^{-5}$ | $1.0 \times 10^{-9}$ |

COMMUNICATION SYSTEM, COMMUNICATION TERMINAL AND COMMUNICATION METHOD

CROSS REFERENCE TO RELATED APPLICATIONS

The present document claims priority to Japanese Priority Document JP 2001-360412, filed in the Japanese Patent Office on Nov. 27, 2001, as well as Japanese Priority Document JP 2002-148227, filed in the Japanese Patent Office on May 22, 2002, the entire contents of which are incorporated herein by reference to the extent permitted by law.

BACKGROUND OF THE INVENTION

1. Field of the Invention

The present invention relates to a communication system capable of wireless or wired communications, and particularly to a communication system capable of switching between a wireless line and an electric power line as deemed appropriate in performing communications. In addition, the present invention relates to a communication system capable of switching between communication modes having different transmission rates in performing communications via the wireless line or the electric power line.

2. Description of the Related Art

In conventional communication systems which switch between wireless and wired lines, in order to perform wired communications, a dedicated communication line is required even under conditions where wired communications seems viable. In addition, in cases where securing a wired network such as a LAN or the like is difficult, it is necessary to continue wireless communications. Therefore, traffic in wireless communications is occupied more than is necessary for reasons such as only the wireless line being used because a wired connection cannot be established. In order to resolve such shortcomings, for example, Issued Japanese Utility Model No. 2583238 or the like is disclosed. According to the technology in this publication, a wireless transmitter and a wired transmitter are provided, and switching between wireless communication and wired communication appropriately is made possible by detecting the connection status of each transmitter. However, even with this technology, a communication line dedicated to wired communication is required, and communications using electric power lines which are versatile cannot be achieved. As such, in Issued Japanese Patent No. 2749248 or the like, an electric power line carrier system using a wireless line and an electric power line concomitantly is disclosed. According to this technology, wireless communications may be performed when a cordless handset is removed from a cradle (battery charger), while wired communications between the cordless handset and a base unit via the electric power line (i.e., a commercial power supply line) may also be performed when the cordless handset is mounted on the cradle.

SUMMARY OF THE INVENTION

However, in the electric power line carrier system mentioned above in which the wireless line and the electric power line are used concomitantly, despite the versatility of being able to plug it in any socket, no consideration is given to appropriately switching between wireless communication and wired communication. In other words, regardless of whether the cradle (the battery charger) is plugged in or not, if the cordless handset is mounted on the cradle (the battery charger), an operation of switching from wireless to wired communication takes place, and thus, situations in which wired communication cannot be established may arise. In a similar manner, if the cordless handset is removed from the cradle (the battery charger) while communicating, if the wireless line is in an incommunicable condition, there is a risk of disconnection. In addition, there is a risk of losing the continuity of transmission data where, for example, the untransmitted data generated while switching between wireless and wired communication is never transmitted. Further, because switching between wireless and wired communication is done without judging the signal level or the packet error rate, it is possible that the quality of the data signals drops or that a disruption in communication arises.

The present invention is proposed taking the foregoing problems into consideration and provides a communication system which switches between a wireless line and an electric power line by judging if signal carrying in the respective systems is possible, and which is capable of transmitting, without fail, untransmitted data generated while switching between the wireless line and the electric power line. Further, the present invention provides a communication system capable of selecting the optimum communication mode from a plurality of wireless communication modes and a plurality of electric power line communication modes and switching thereto.

In order to achieve what is described above, the present invention, in a communication system which performs communications by selectively switching between a wireless communication system for communicating with a communication partner via a wireless line and a wired communication system for communicating with a communication partner via an electric power line for supplying electric power to a communication terminal, detects the communication quality of the wireless communication system and the wired communication system, and performs system switching to the communication system with the better communication quality. Thus, it is possible to communicate while constantly using a communication system with a good communication quality.

In other words, according to an embodiment of the communication system of the present invention, because it is possible to constantly detect the communication quality of the wireless communication system and the wired communication system, and switch without delay to the communication system having the better communication quality, stable communication may be secured.

In addition, the communication system according to an embodiment of the present invention may detect the signal quality of the wireless communication system while communicating via the wired communication system, and if the wireless communication system has a certain level of communication quality or above, system switching from the wired communication system to the wireless communication system is performed.

In other words, according to an embodiment of the communication system of the present invention, the communication quality of the wireless system, for example, is detected while communicating via the electric power line, and if the communication quality of this wireless communication system is higher than that of the electric power line presently in use, it is possible to immediately switch from the wired communication system of the electric power line to the wireless communication system.

In addition, a communication terminal according to an embodiment of the present invention and for performing communications by selectively switching between a wireless communication system for communicating with a communication partner via a wireless communication line and a wired communication system for communicating with a communication partner by transmitting a signal via an electric power line for supplying electricity, includes communication quality detecting means for detecting the communication quality of the wireless communication system and the wired communication system; and switch means for switching between the wireless communication system and the wired communication system on the basis of a judgment result of the communication quality detecting means.

In other words, according to an embodiment of the communication terminal of the present invention, the communication quality detecting means constantly detects the communication quality of the wireless communication system and the wired communication system and notifies the judgment result to the switch means. Therefore, the switch means can switch from the wireless communication system or the wired communication system to the system having the better communication quality without delay. Thus, it is possible to secure stable communication.

In addition, the communication terminal according to an embodiment of the present invention may further include untransmitted data transmitting means for judging whether or not there exists untransmitted data in the process of switching between the communication systems with the switch means and transmitting the untransmitted data after switching between the communication systems in the event that untransmitted data exists.

In other words, according to an embodiment of the communication terminal of the present invention, if the switch means is to perform switching between the wireless communication system and the wired communication system in accordance with the communication quality thereof, in the event that there is untransmitted data in the communication system in use prior to switching, the untransmitted data is transmitted to the post-switching communication system. Thus, there is no risk of having discontinuous audio or losing part of some image data due to the switching of communication systems.

In addition, the communication quality detecting means of the communication terminal according to an embodiment of the present invention may enable system switching from the wireless communication system to the wired communication system by performing a communication negotiation with the communication partner in the event that the communication partner connected to the wireless communication system judges, during communication via the wireless communication system, that the communication quality of the wired communication system is better.

In other words, according to an embodiment of the communication terminal of the present invention, even if it is judged that the communication quality of the wired communication system is good, the communication quality detecting means negotiates with the communication partner and switches to the wired communication system only when the wired communication system is in a usable condition. Thus, communication resources may be utilized effectively.

In addition, the communication quality detecting means of the communication terminal according to an embodiment of the present invention may enable system switching from the wireless communication system to the wired communication system using a line of an alternative electric power line selected in accordance with a predefined routing rule in the event that the communication partner connected to the wireless communication system judges, during communication via the wireless communication system, that the communication quality of the wired communication system is inferior.

In other words, according to an embodiment of the communication terminal of the present invention, the communication quality detecting means may detect, during communication via the wireless communication system, the communication quality of a plurality of electric power lines, and may perform switching to the wired communication system by selecting from among the plural electric power lines the electric power line with the best communication quality.

In addition, the communication terminal according to an embodiment of the present invention may switch to the wired communication system of the electric power line when a communication failure occurs in the wireless communication system due to interference from another communication system.

In other words, according to an embodiment of the communication terminal of the present invention, when there is a communication failure in the wireless communication system, an immediate switch to the wired communication system of the electric power line or the like may be performed. Thus, even in communication systems, such as a wireless LAN or the like, lacking in wireless communication resources, a good communication condition may be secured constantly, and communication resources may be utilized effectively.

In addition, the communication terminal of the present invention may switch to the wired communication system within a predefined period when a communication failure occurs in the wireless communication system.

In other words, according to an embodiment of the communication terminal of the present invention, if, for example, it is judged that it is difficult to continue communicating via the wireless communication system due to a communication failure or the like, switching to the wired communication system within a predefined period may be performed. Thus, a stable communication may be secured constantly.

In addition, in the communication terminal according to an embodiment of the present invention, the wireless communication system and the wired communication system may be categorized into a plurality of communication modes having different data transmission rates, and the communication mode with the best communication quality may be selected from the respective communication modes of the wireless communication system and the respective communication modes of the wired communication system.

In other words, according to an embodiment of the communication terminal of the present invention, because the wireless communication system and the wired communication system are categorized into a plurality of communication modes having different data transmission rates, the communication mode having the best communication quality may be selected from among these communication modes and be switched to. Thus, as compared to communicating in a single communication mode by the wireless communication system or the wired communication system, communication in a more efficient communication mode may be performed.

In addition, in an embodiment of the communication terminal of the present invention, the wireless communication system may include a wireless processing unit and the wired communication system may include an electric power line carrier communication processing unit, and the communication terminal may include: processing means for calculating an average value of throughput shift for each of the communication modes by measuring the throughput, which is a measure of data transmission amount per unit time, a plurality of times; storage means for storing in a table the average value of throughput shift calculated by the processing means; and judging means for judging the highest average value of throughput shift by comparing the average values of throughput shift corresponding to the respective communication modes stored in the table of the storage means. The judging means may use the average value of throughput shift as a criterion for judging the communication quality level, and select a communication mode corresponding to the highest average value of throughput shift.

In other words, according to an embodiment of the communication terminal of the present invention, by taking throughput, which is a measure of data transmission amount per unit time, to be a criterion for deciding whether to switch the communication mode, the optimum communication mode may be selected from the various communication modes of the wireless communication system, such as a wireless LAN or the like, and the various communication modes of the wired communication system, such as electric power line carrier communication or the like, to switch between communication systems. Thus, as compared to communicating in a single communication mode by the wireless communication system or the wired communication system, communicating in a more efficient communication mode may be made possible.

In addition, in the communication terminal according to an embodiment of the present invention, the wireless communication system may include a wireless processing unit, the wired communication system may include an electric power line carrier communication processing unit, and the communication terminal may include: processing means for calculating an average value of relative noise level shift on the basis of the difference between an average value of noise level shift that is obtained by averaging a plurality of measurements of noise level per unit frequency and a reference noise level; storage means for storing in a table the average value of relative noise level shift calculated by the processing means; and judging means for judging the lowest average value of relative noise level shift by comparing the average values of relative noise level shift corresponding to the respective communication modes and stored in the table of the storage means. The judging means may use the average value of relative noise level shift as a criterion for judging the communication quality level to select the communication mode corresponding to the lowest average value of relative noise level shift.

In other words, according to an embodiment of the communication terminal of the present invention, by using the noise level per unit frequency of each of the communication modes to be a criterion for deciding whether to switch the communication mode, the optimum communication mode may be selected from the various communication modes of the wireless communication system, such as a wireless LAN or the like, and the various communication modes of the wired communication system, such as electric power line carrier communication or the like, to switch between communication systems. Thus, as compared to communicating in a single communication mode by the wireless communication system or the wired communication system, communicating in a more efficient communication mode may be made possible.

In addition, in the communication terminal according to an embodiment of the present invention, the wireless communication system may include a wireless processing unit, the wired communication system may include an electric power line carrier communication processing unit, and the communication terminal may include: processing means for calculating an average value of relative delay spread shift on the basis of the difference between an average value of delay spread shift obtained by averaging a plurality of measurements of delay spread which is a standardized deviation along the time axis of a propagation power density distribution and a reference delay spread; storage means for storing in a table the average value of relative delay spread shift calculated by the processing means; and judging means for judging the lowest average value of relative delay spread shift by comparing the average values of relative delay spread shift corresponding to the respective communication modes stored in the table of the storage means. The judging means may use the average value of relative delay spread shift as a criterion for judging the communication quality to select the communication mode corresponding to the lowest average value of relative delay spread shift.

In other words, according to an embodiment of the communication terminal of the present invention, by taking the delay spread, which is a standardized deviation of a delay time of a reflective electric power wave form for each of the communication modes, to be a criterion for deciding whether to switch communication modes, and the optimum communication mode may be selected from the various communication modes of the wireless communication system, such as a wireless LAN or the like, and the various communication modes of the wired communication system, such as an electric power line carrier communication or the like, to switch between communication systems. Thus, as compared to communicating in a single communication mode by the wireless communication system or the wired communication system, communicating in a more efficient communication mode may be made possible.

In addition, in the communication terminal according to an embodiment of the present invention, the wireless communication system may include a wireless processing unit, the wired communication system may include an electric power line carrier communication processing unit, and the communication terminal may include: processing means for calculating the number of dip points at which the reception power drops below a predetermined electric power level across a predetermined frequency width or the total value of the frequency widths of the dip points; storage means for storing in a table the number of the dip points or the total value of the frequency widths calculated by the processing means as a dip level; and judging means for judging the lowest dip level by comparing the dip levels corresponding to the respective communication modes stored in the table of the storage means. The judging means may use the dip level as a criterion for judging the communication quality level to select the communication mode corresponding to the lowest dip level.

In other words, according to an embodiment of the communication terminal of the present invention, by using the dip level, which indicates the extent to which the received power of each of the communication modes falls below a certain level on the frequency axis, as a criterion for deciding whether to switch communication modes, the optimum communication mode may be selected from the various communication modes of the wireless communication system, such as a wireless LAN or the like, and the various communication modes of the wired communication system, such as an electric power line carrier communication or the like, to switch between communication systems. Thus, as compared to communicating in a single communication mode by the wireless communication system or the wired communication system, communicating in a more efficient communication mode may be made possible.

In addition, in the communication terminal according to an embodiment of the present invention, the wireless communication system may include a wireless processing unit, the wired communication system may include an electric power line carrier communication processing unit, and the communication terminal may include: processing means for calculating the average value of packet error rate shift for the respective communication modes on the basis of multiple measurements of the packet error rate which represents the ratio of packets that fail during transmission to the transmitted packets; storage means for storing in a table the average value of packet error rate shift calculated by the processing means; and judging means for judging the lowest average value of packet error rate shift by comparing the average values of packet error rate shift corresponding to the respective communication modes stored in the table of the storage means. The judging means may use the average value of packet error rate shift as a criterion for judging the communication quality level to select the communication mode corresponding to the lowest average value of packet error rate shift.

In other words, according to an embodiment of the communication terminal of the present invention, by using, for each of the communication modes, a packet rate showing the ratio of the packets that fail during transmission to transmitted packets as a criterion for deciding whether to switch communication modes, the optimum communication mode may be selected from the various communication modes of the wireless communication system, such as a wireless LAN or the like, and the various communication modes of the wired communication system, such as an electric power line carrier communication or the like, to switch between communication systems. Thus, as compared to communicating in a single communication mode by the wireless communication system or the wired communication system, communicating in a more efficient communication mode may be made possible.

In addition, in the communication terminal according to an embodiment of the present invention, the wireless communication system may include a wireless processing unit, the wired communication system may include an electric power line carrier communication processing unit, and the communication terminal may include: processing means for calculating the average value of bit error rate shift for each of the communication modes on the basis of a plurality of measurements of the bit error rate which represents the ratio of the amount of bits of data that fail during transmission to the amount of bits of transmitted data; storage means for storing in a table the average value of bit error rate shift calculated by the processing means; and judging means for judging the lowest average value of bit error rate shift by comparing the average values of bit error rate shift corresponding to the respective communication modes stored in the table of the storage means. The judging means may use the average value of bit error rate shift as a criterion for judging the communication quality level to select the communication mode corresponding to the lowest average value of bit error rate shift.

In other words, according to an embodiment of the communication terminal of the present invention, by using the bit error rate, which indicates the ratio of bit errors to the transmitted data for each of the communication modes, as a criterion for judging the communication quality, the optimum communication mode from among the various communication modes of the wireless communication system, such as a wireless LAN or the like, and the various communication modes of the wired communication system, such as an electric power line carrier communication or the like, may be selected to switch between communication systems. Thus, as compared to communicating in a single communication mode by the wireless communication system or the wired communication system, communicating in a more efficient communication mode may be made possible.

Further, in a communication method for performing communications between a communication terminal and a communication partner by selectively switching between a wireless communication system, which performs communications by transmitting a radio signal via a wireless communication line, and a wired communication system, which performs communications by transmitting a signal via an electric power line for supplying electricity to the communication terminal, the communication method according to an embodiment of the present invention may include: a step for detecting the communication quality of each communication system; and a step for selectively switching between the wireless communication system and the wired communication system on the basis of a judgment result of the communication quality detecting step. Thus, it is possible to switch from either the wireless communication system or the wired communication system to the communication system with the better communication quality, and stable communications may be secured.

In addition, the communication method according to an embodiment of the present invention may include a step for judging whether or not there existed any untransmitted data in the process of switching between communication systems in the step for selectively switching between communication systems, and transmitting the untransmitted data after the switching of the communication system is complete in the event that there existed untransmitted data. Thus, the risk of having discontinuous audio or losing part of an image data may be eliminated.

In addition, in the communication method according to an embodiment of the present invention, if, while communicating via the wireless communication system, it is judged in the step for detecting the communication quality of each communication system that the quality of communications between the communication partner via the wired communication system is better, the communication terminal may conduct a communication negotiation with the communication partner in the step for selectively switching between communication systems, and may enable switching from the wireless communication system to the wired communication system. Thus, communication resources may be utilized effectively.

In addition, in the communication method according to an embodiment of the present invention, if it is judged in the step for detecting the communication quality that the communication quality of the communications between the communication partner via the wired communication system is inferior, a line of a wired communication system via an alternative electric power line is selected in accordance with a predetermined routing rule in the step for selectively switching between communication systems, and switching from the wireless communication system to the wired communication system using the line of the selected wired communication system may be performed. Thus, it is possible to select the electric power line having the best communication quality from among a plurality of electric power lines to switch to the wired communication system.

In addition, in the communication method according to an embodiment of the present invention, when a communication failure occurs in the wireless communication system due to interference from another communication system, switching to the wired communication system may be performed in the step for selectively switching between communication systems. Thus, communication resources may be utilized effectively.

In addition, in the communication method according to an embodiment of the present invention, when a communication failure occurs in the wireless communication system, a switching of the communication terminal to the wired communication system within a predetermined period may be performed in the step for selectively switching between communication systems. Thus, stable communications may be secured.

In addition, in the communication method according to an embodiment of the present invention, the wireless communication system and the wired communication system may be categorized into a plurality of communication modes having different data transmission rates, and each of the communication modes of the wireless communication system and each of the communication modes of the wired communication system may be selected in accordance with the communication quality thereof. Thus, as compared to communicating in a single communication mode by the wireless communication system or the wired communication system, and communicating in a more efficient communication mode may be made possible.

In addition, in the communication method according to an embodiment of the present invention, the wireless communication system may include a wireless processing unit, the wired communication system may include an electric power line carrier communication processing unit, and the communication method may include the steps of: calculating an average value of throughput shift for each communication mode by measuring throughput, which is the data transmission amount per unit time, plural times; storing in a table the calculated average value of throughput shift; and judging the highest average value of throughput shift by comparing the average values of throughput shift corresponding to the respective communication modes stored in the table; and selecting the communication mode corresponding to the highest average value of throughput shift by using the average value of throughput shift as a criterion for judging the communication quality level. Thus, as compared to communicating in a single communication mode by the wireless communication system or the wired communication system, communicating in the more efficient communication mode may be made possible.

In addition, in the communication method according to an embodiment of the present invention, the wireless communication system may include a wireless processing unit, the wired communication system may include an electric power line carrier communication processing unit, and the communication method may include the steps of: calculating an average value of relative noise level shift on the basis of the difference between an average value of noise level shift obtained by averaging multiple measurements of a noise level per unit frequency and a reference noise level; storing in a table the calculated average value of relative noise level shift; judging the lowest average value of relative noise level shift by comparing the average values of relative noise level shift corresponding to the respective communication modes stored in the table; and selecting the communication mode corresponding to the lowest average value of relative noise level by using the average value of relative noise level shift as a criterion for judging the communication quality level. Thus, as compared to communicating in a single communication mode by the wireless communication system or the wired communication system, communicating in a more efficient communication mode may be made possible.

In addition, in the communication method according to an embodiment of the present invention, the wireless communication system may include a wireless processing unit, the wired communication system may include an electric power line carrier communication processing unit, and the communication method may include the steps of: calculating an average value of relative delay spread shift on the basis of the difference between an average value of delay spread shift obtained by averaging multiple measurements of delay spread, which indicates a standardized deviation along the time axis of a propagation electric power density distribution, and a reference delay spread; storing in a table the calculated average value of relative delay spread shift; judging the lowest average value of relative delay spread shift by comparing the average values of relative delay spread shift corresponding to each communication mode stored in the table; and selecting the communication mode corresponding to the lowest average value of relative delay spread shift by using the average value of relative delay spread shift as a criterion for judging the communication quality level. Thus, as compared to communicating in a single communication mode by the wireless communication system or the wired communication system, communicating in a more efficient communication mode may be made possible.

In addition, in the communication method according to an embodiment of the present invention, the wireless communication system may include a wireless processing unit, the wired communication system may include an electric power line carrier communication processing unit, and the communication method may include the steps of: calculating the number of dip points at which the received power drops below a predetermined electric power level across a predetermined frequency width or a total value of the frequency widths of the dip points; storing in a table the calculated number of dip points or the calculated total value of the frequency widths as a measure of dip level; judging the lowest dip level by comparing the dip levels corresponding to the respective communication modes stored in the table; and selecting the communication mode corresponding to the lowest dip level by using the dip level as a criterion for judging the communication quality level. Thus, as compared to communicating in a single communication mode by the wireless communication system or the wired communication system, communicating in a more efficient communication mode may be made possible.

In addition, in the communication method according to an embodiment of the present invention, the wireless communication system may include a wireless processing unit, the wired communication system may include an electric power line carrier communication processing unit, and the communication method may include the steps of: calculating an average value of packet error rate shift for each communication mode on the basis of multiple measurements of the packet error rate, which represents the ratio of packets that fail during transmission to transmitted packets; storing in a table the calculated average value of packet error rate shift; judging the lowest average value of packet error rate shift by comparing the average values of packet error rate shift corresponding to the respective communication modes stored in the table; and selecting the communication mode corresponding to the lowest average value of packet error rate shift by using the average value of packet error rate shift as a criterion for judging the communication quality level. Thus, as compared to communicating in a single communication mode by the wireless communication system or the wired communication system, communicating in a more efficient communication mode may be made possible.

In addition, in the communication method according to an embodiment of the present invention, the wireless communication system may include a wireless processing unit, the wired communication system may include an electric power line carrier communication processing unit, and the communication method may include the steps of: calculating an average value of bit error rate shift for each communication mode on the basis of multiple measurements of the bit error rate, which represents the ratio of the amount of bits of data that fail during transmission to the amount of bits of transmitted data; storing in a table the calculated average value of bit error rate shift; judging the lowest average value of bit error rate shift by comparing the average values of bit error rate shift corresponding to the respective communication modes stored in the table; and selecting the communication mode corresponding to the lowest average value of bit error rate shift by using the average value of bit error rate shift as a criterion for judging the communication quality level. Thus, since the optimum communication mode is selected on the basis of the ratio of the bit error to each transmission data, a judgment of a higher accuracy on the communication quality as compared to that of the packet error rate may become possible.

As described above, according to an embodiment of the communication system of the present invention, switching between communication via the wireless communication system and communication via the electric power line communication system may be performed as deemed appropriate in monitoring each of the communication modes. Thus, even in systems, such as a wireless LAN and the like, lacking in wireless communication resources, the communication resources thereof may be utilized effectively. In addition, while the communication apparatus is being charged, since communication is performed via the electric power line, and the power that is to charge the secondary battery is not used for wireless communication, electric power resources of the secondary battery may be utilized effectively. Accordingly, charging power may be utilized effectively in the charging of the secondary battery. Further, in communicating via the electric power line, since there is no need to expand the communication network, communication medium costs, such as communication cables, may be reduced as compared to normal wired communications.

In addition, according to an embodiment of the communication system of the present invention, if the communication terminal is connected to an electric power supplying means and is physically connected to the electric power line while at the same time, the signal quality of the wired communication system is at or above a certain level when communication via the wireless communication system is being performed, switching from the wireless communication system to the wired communication system may be performed, and further, untransmitted data generated while switching may be transmitted after the switching from the wireless communication system to the wired communication system is complete. Thus, continuity of the communicated data signals may be maintained while enabling a smooth mutual transition between wireless communication and communication via the electric power line. Further, since, by virtue of communication switching systems such as that described above, it is possible to effectively switch between the wireless communication system and the electric power line communication system, communications in which wireless communication resources are utilized effectively, while sparing unnecessary wireless communications, may be realized.

In addition, according to an embodiment of the communication system of the present invention, when the communication terminal is connected to the electric power supplying means or the like while communications via the wireless communication system are being performed, whether or not the communication partner is also capable of using the wired communication system via the electric power line may be determined. Then, if the wired communication system is available on both sides, the communication terminal may negotiate with the communication partner, automatically switch the communication system from the wireless communication system to the carrier communication of the wired communication system via the electric power line, and continue communicating. Thus, wireless communication resources may be utilized effectively while avoiding congestion by excessive wireless communications.

In addition, according to an embodiment of the communication system of the present invention, even in a case where electric power line carrier communication cannot be performed directly with the communication partner currently in wireless communication, by selecting an electric power line carrier gateway according to a predefined routing rule, communication may be continued via carrier communication using the selected electric power line. As such, communication may be performed by switching between the wireless communication system and the wired communication system via the optimum electric power line as deemed appropriate, while monitoring the availability of the respective communication systems. Thus, even in systems, such as a wireless LAN and the like, lacking in wireless communication resources, the wireless communication resources thereof may be utilized effectively. In addition, by communicating via the electric power line while charging the communication terminal, since the charging power for the secondary battery is not used for wireless communications, electric power resources of the secondary battery may be utilized effectively. Accordingly, the power to charge the secondary battery may be used efficiently for charging. Further, in communicating via the electric power line, since there is no need to expand the communication network, communication medium costs, such as a communication cables and the like, may be reduced as compared to normal wired communication.

In addition, in an embodiment of the communication system according to the present invention, when a communication failure occurs in the wireless communication system due to interference from another communication system, the communication terminal may switch from the wireless communication system to the wired communication system via the electric power line by connecting itself to the electric power supplying means. Particularly, the communication terminal may switch from the wireless communication system to the wired communication system by connecting itself to the electric power supplying means within a predefined period from when the communication failure in the wireless communication system occurs. Thus, even if continuing wireless communication becomes difficult due to interference from another communication system or the like, stable communication may be secured by switching from wireless communication to electric power line communication.

In addition, according to an embodiment of the present invention, the communication system may seamlessly switch to the communication mode with the highest communication quality level, where the communication modes may include communication modes of the wireless communication system, such as Bluetooth™, UWB (Ultra Wideband), and the like in addition to wireless LAN, as well as communication modes of the wired communication system, such as coaxial cable communication and telephone line communication and the like in addition to electric power line carrier communication. More specifically, it is possible to select the optimum communication mode from the various communication modes in the wireless LAN and the various communication modes in electric power line carrier communication and switch thereto, where the criterion/criteria for switching may include communication quality levels, such as throughput, noise level, delay profile, dip level, PER, BER or the like. Thus, as compared to communicating in a single communication mode in the wireless LAN or electric power line carrier communication, communicating in a more efficient communication mode may be made possible.

In addition, according to an embodiment of the communication system of the present invention, switching between communication modes of the wireless LAN and communication modes of electric power line carrier communication, which are used in the home as well as in offices, depending on the current communication quality level. For example, if a door or the like of a room is closed while the wireless LAN is in operation, or if the propagation condition of the radio waves is altered due to movements of a human being or the like, thereby lowering the communication quality level, the communication system is immediately switched to the optimum communication mode in electric power line carrier communication. Accordingly, even in cases where signals are attenuated mid-communication thereby making it difficult for the radio waves to travel, communications may be maintained normally.

In addition, in an embodiment of the communication system according to the present invention, it is not necessary to adopt a fallback system in which the modulation method or encoding rate is altered to lower the transmission rate, or to adopt an antenna diversity system in which switching between transmission antennas or receiving antennas or the like is performed. Accordingly, a communication system capable of effectively switching between wireless communication and wired communication without complicating the circuit configuration of the communication system may be configured economically.

BRIEF DESCRIPTION OF THE DRAWINGS

The invention disclosed herein will become better understood as a detailed description is made of the preferred embodiments with reference to the appended drawings in which:

FIG. 12 is an example of a measurement data table when throughput is used as a criterion for judging whether to switch communication modes;

FIG. 14 is an example of a measurement data table when noise level is used as a criterion for judging whether to switch communication modes;

FIG. 16 is an example of a measurement data table when delay profile is used as a criterion for judging whether to switch communication modes;

FIG. 18 is an example of a measurement data table when dip level is used as a criterion for judging whether to switch communication modes;

FIG. 20 is an example of a measurement data table when PER is used as a criterion for judging whether to switch communication modes; and FIG. 21 is an example of a measurement data table when BER is used as a criterion for judging whether to switch communication modes.

Figure 1:
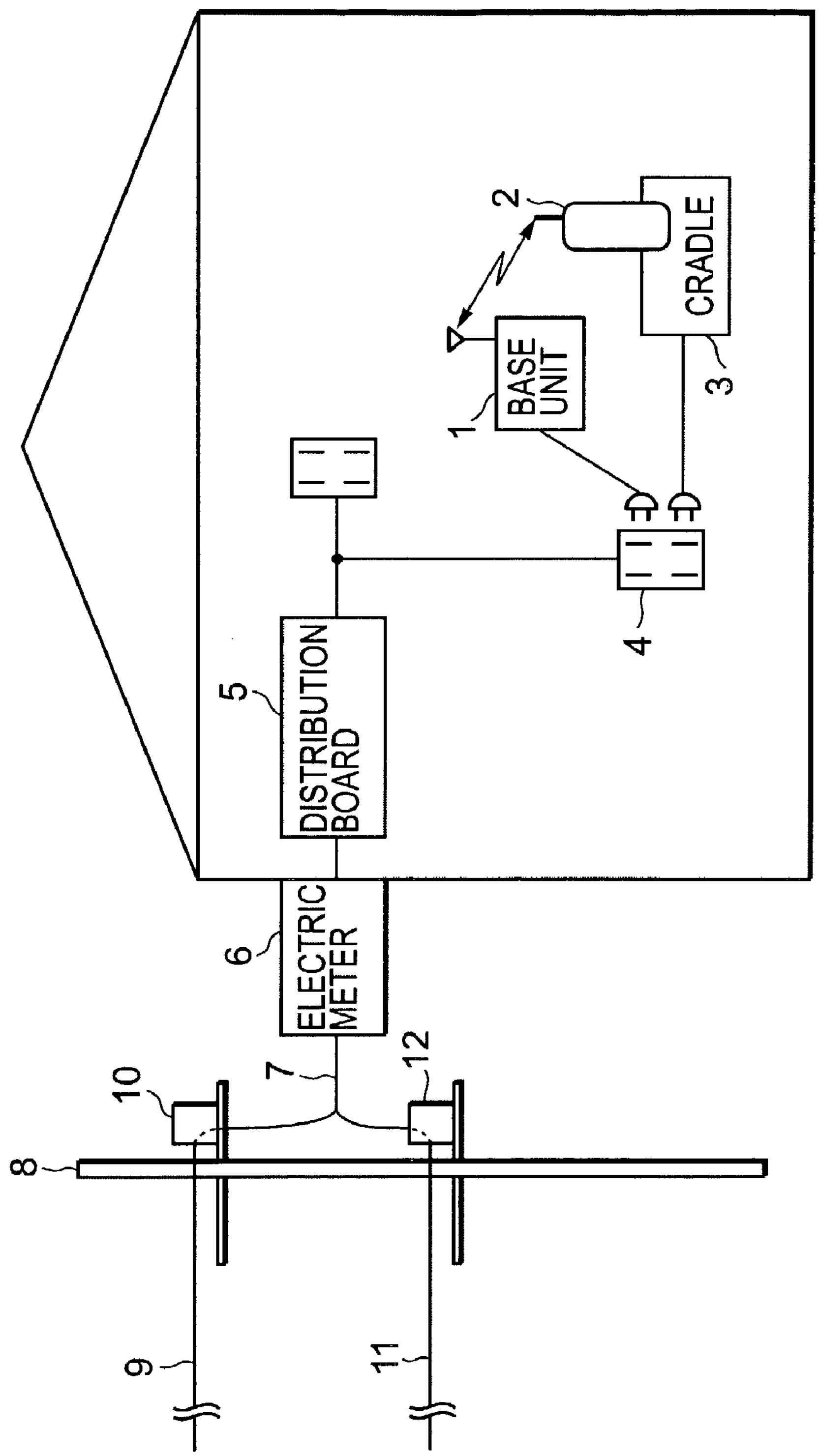
FIG. 1 is a conceptual diagram of a communication system for switching between wireless and wired communication using a base unit and a cordless handset in a first embodiment of the present invention.

All figures are drawn for ease of explanation of the basic teachings of the present invention only; the extensions of the Figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

DETAILED DESCRIPTION OF THE PREFERRED EMBODIMENTS

Several embodiments of the communication system according to the present invention are explained below with reference to the attached drawings. A characteristic of an example of an embodiment of the present invention is that, when a wireless communication device is mounted on a cradle (i.e., a battery charger) or connected to an adapter, and further, is physically connected to an electric power line, carrier communication using the electric power line may be performed in place of wireless communication. In addition, a characteristic of an example of an embodiment of the present invention is that, when the wireless communication device is connected to the electric power line through the battery charger, the adapter or the like during wireless communication, it is determined whether or not the communication partner with whom wireless communication is being performed is able to use the electric power line for communication in a similar manner, and if the communication partner is able to use the electric power line for communication, negotiation with a communication device of the communication partner is performed, after which switching from wireless communication to electric power line carrier communication is executed, and communication is continued without leaving any untransmitted data.

In addition, a characteristic of an example of an embodiment of the present invention is that, even in a case where direct carrier communication with the communication device of the communication partner via the electric power line is not possible, by selecting an electric power line carrier gateway according to an appropriate routing rule, continuing communication using a carrier communication line via the selected electric power line is made possible. Further, a characteristic of an example of an embodiment of the present invention is that, even in a case where it is difficult to continue wireless communication due to interference from other communication systems, stable communication may be secured by switching from wireless communication to communication using the electric power line. Thus, by effectively utilizing wired communication via a communication network employing the electric power line, which has little spatial constraints, while effectively alternating between wired and wireless communications as deemed appropriate, an effective use of the wireless communication resources is achieved.

First Embodiment

FIG. 1 is a conceptual diagram of a communication system for switching between wireless communication and wired communication using a base unit and a cordless handset according to a first embodiment of the present invention. In other words, this drawing illustrates a concept of a communication system in which a cordless handset 2 is switched between wireless communication and wired communication. In this drawing, the communication system includes a base unit 1, the cordless handset 2 which communicates via the base unit 1, a cradle (battery charger) 3 for charging the cordless handset 2, a socket 4 for connecting each of the base unit 1 and the cradle 3 to an electric power line, a distribution board 5 for distributing the electric power line, an electric meter 6 for measuring the integral electric power in the facility, a lead-in wire 7 for leading the electric power line in from outside, a pole-top potential transformer 10 mounted on an electric pole 8 for stepping a high voltage from an electric cable 9 down to a lower level, and an optical fiber modem 12, mounted on the electric pole 8, for converting an electric power line signal from the lead-in wire 7 into an optical signal and transmitting the optical signal to an optical fiber cable 11.

In the embodiment of the communication system according to the present invention thus configured, normally, when the cordless handset 2 communicates, wireless communication is performed between the cordless handset 2 and the base unit 1, and the cordless handset 2 performs external communication via a telephone line (not shown) from the base unit 1. In this case, when the cordless handset 2 is mounted on the cradle 3 and further, the cradle 3 is plugged in the socket 4, a communication line of the cordless handset 2 is established with the following route: the cordless handset 2→the cradle 3→the socket 4→the base unit 1→the socket 4→the distribution board 5→the electric meter 6→the optical fiber modem 12→the optical fiber cable 11. In other words, a communication line via the electric power line is established from the electric pole 8 outside to the cordless handset 2. In this case, if the situation allows for communication via the electric power line, the cordless handset 2 performs communication via the optical fiber modem 12 and the optical fiber cable 11 from the electric power line.

In addition, by mounting the cordless handset 2 on the cradle 3, it is possible to charge a built-in secondary battery in the cordless handset 2. In other words, by periodically placing the cordless handset 2 on the cradle 3, the secondary battery can be charged. Accordingly, even if the capacity of the secondary battery falls below the minimum capacity required to continue communication, the electric power necessary for continuing communication may be secured by connecting the cordless handset 2 to the cradle 3. Naturally, it is also possible to perform wired communication via the electric power line while charging the cordless handset 2.

Figure 2:
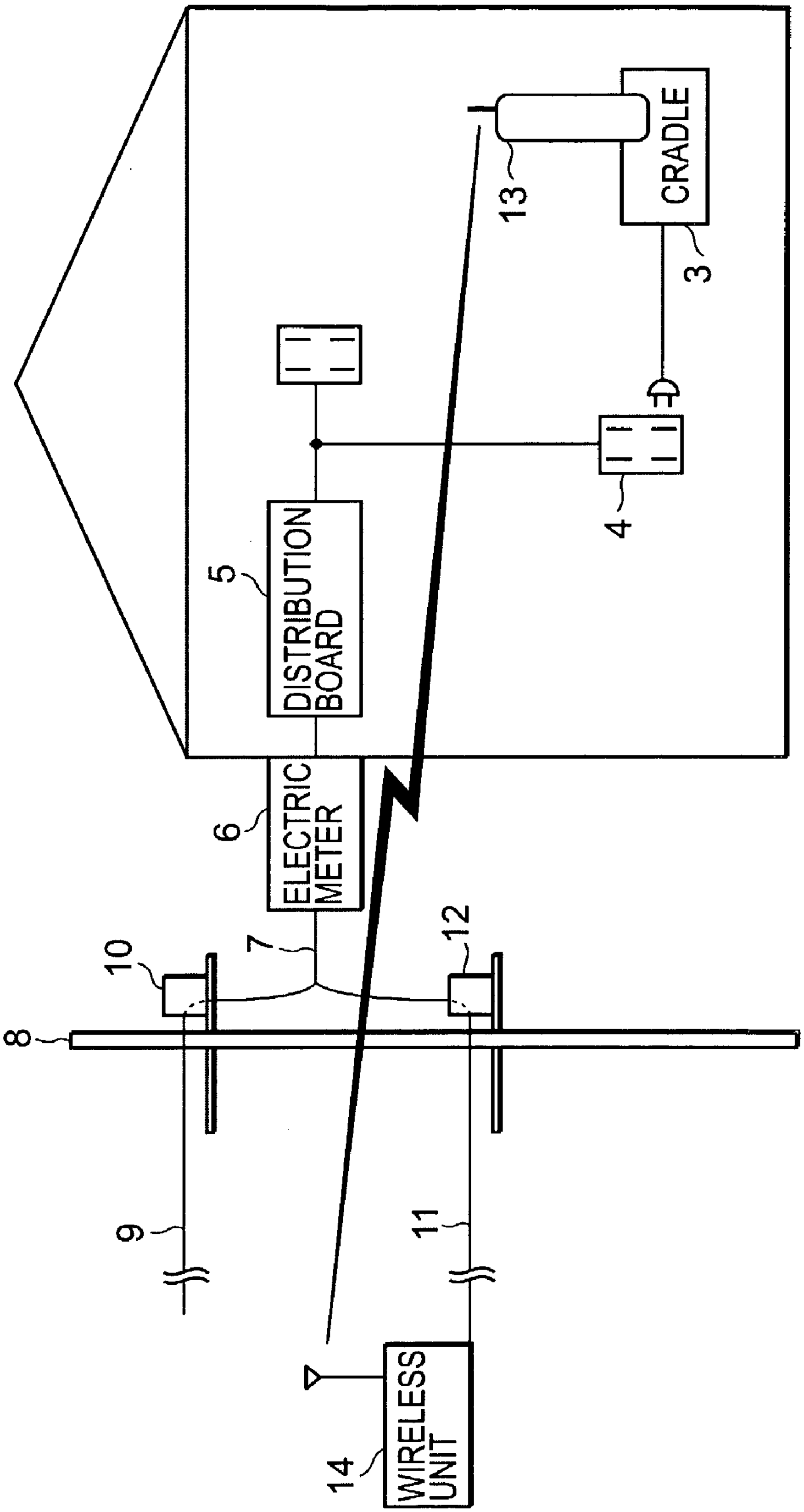
FIG. 2 is a conceptual diagram of a communication system for switching between wireless communication and wired communication using a portable telephone in the first embodiment of the present invention.

In addition, performing wired communication via the electric power line is possible not only with the cordless handset 2 but also with a portable telephone. FIG. 2 is a conceptual diagram of a communication system for switching between wireless communication and wired communication using a portable telephone in the first embodiment of the present invention. In other words, this drawing illustrates a concept of the communication system for switching a portable telephone 13 between wireless communication and wired communication. In FIG. 2, the parts having the same names as those in FIG. 1 are identified with the same reference numerals. In FIG. 2, the communication system is configured with the portable telephone 13, a cradle (battery charger) 3 for charging the portable telephone 13, a socket 4 for connecting the cradle 3 to an electric power line, a distribution board 5 for distributing the electric power line, an electric meter 6 for measuring the integral electric power in the facility, a lead-in wire 7 for leading in the electric power line from outside, a pole-top potential transformer 10 mounted on an electric pole 8 for stepping a high voltage from an electric cable 9 down to a lower level, an optical fiber modem 12 mounted on the electric pole 8 for converting an electric power line signal from the lead-in wire 7 into an optical signal to transmit it to an optical fiber cable 11, and a wireless unit 14 for forming a wireless or wired communication area with respect to the portable telephone 13. According to the first embodiment, the wireless unit 14 may represent a base station.

In the communication system thus configured, normally, when the portable telephone 13 performs communication, the portable telephone 13 performs wireless communication with the wireless unit 14. In this case, if the portable telephone 13 is mounted on the cradle 3 and further, the cradle 3 is plugged in the socket 4, a wired communication line of the portable telephone 13 is established with the following route: the portable telephone 13→the cradle 3→the socket 4→the distribution board 5→the electric meter 6→the optical fiber modem 12→the optical fiber cable 11→the wireless unit 14. In other words, a communication line via the electric power line is established from the electric pole 8 outside to the portable telephone 13. In this case, if the situation allows for communication via the electric power line, the portable telephone 13 performs communication with the wireless unit 14 via the electric power line, the optical fiber modem 12 and the optical fiber cable 11. Naturally, the portable telephone 13 may be charged when the portable telephone 13 is mounted on the cradle 3.

Figure 4:
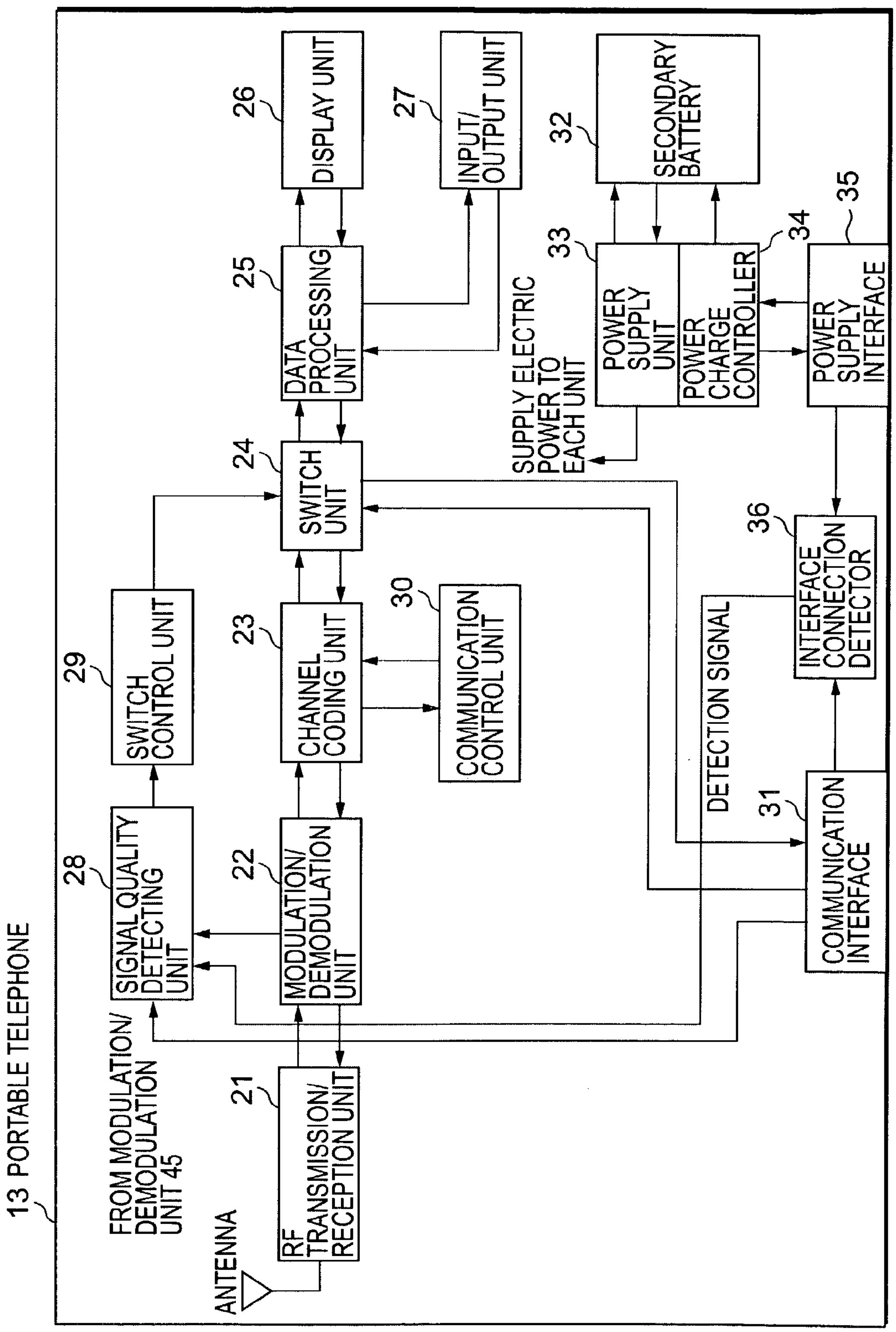
FIG. 4 is a block diagram indicating the inner configuration of the portable telephone according to the first embodiment of the present invention.
Figure 5:
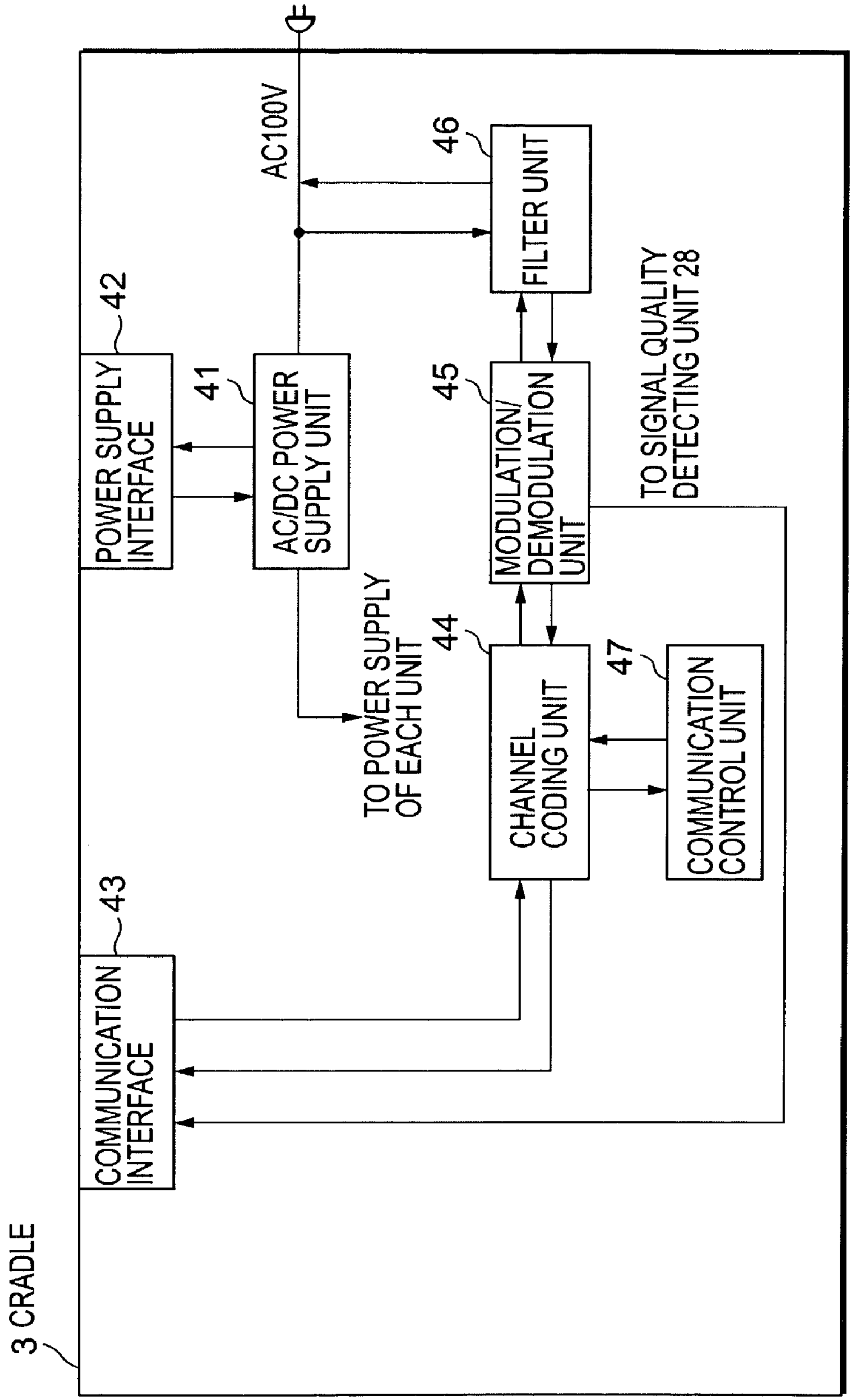
FIG. 5 is a block diagram indicating the inner configuration of a cradle according to the first embodiment of the present invention.

Below, the communication system according to the first embodiment will be explained further in detail. Since the configuration of the system for switching between wireless communication and wired communication are similar for both the base unit and cordless handset shown in FIG. 1 described above, and the portable telephone shown in FIG. 2 described above, in the following explanation, a case in which the portable telephone shown in FIG. 2 is used will be described in detail. FIG. 4 is a block diagram illustrating the inner configuration of a portable telephone according to the first embodiment of the present invention. FIG. 5 is a block diagram illustrating the inner configuration of a cradle according to the first embodiment of the present invention. In other words, FIG. 4 shows the inner configuration of the portable telephone 13 shown in FIG. 2, and FIG. 5 shows the inner configuration of the cradle 3 shown in FIG. 2. Naturally, FIG. 4 may also illustrate the inner configuration of the cordless handset 2 shown in FIG. 1, and FIG. 5 may illustrate the inner configuration of the cradle 3 shown in FIG. 1.

In FIG. 4, the portable telephone 13 includes: an RF transmission/reception unit 21 for transmitting and receiving an RF signal via an antenna; a modulation/demodulation unit 22 for performing conversion processing between the RF signals and base band signals; a channel coding unit 23 for carrying out signal processing (for example, packetizing, multiplexing and scrambling) that is necessary for transmission within a wireless communication zone; a switch unit 24 for switching the communication line between a wireless communication system and an electric power line communication system; a data processing unit 25 for carrying out the appropriate signal processing on the base band signal; a display unit 26 for displaying data which has been allotted by the data processing unit 25; an input/output unit 27 for inputting and outputting data; a signal quality detecting unit 28 for detecting the quality level of a signal transmitted and received via a wireless line or a signal transmitted and received via the electric power line; a switch control unit 29 for controlling the switching operation of the switch unit 24 on the basis of signal level quality information from the signal quality detecting unit 28; a communication control unit 30 for performing processing by controlling each part of the portable telephone 13 so that communication is performed appropriately; a communication interface 31 which mediates for the communication system of the electric power line; a secondary battery 32 for temporarily accumulating electric power to be used by the portable telephone 13; a power supply unit 33 for converting, as required, the voltage of the electric power supplied from the secondary battery 32 and for supplying electric power to each part of the portable telephone 13; a power charge controller 34 for controlling the charging of the secondary battery 32; a power supply interface 35 for connecting a power supply system to the cradle 3; and an interface connection detector 36.

In addition, the cradle 3 shown in FIG. 5 includes: an AC/DC power supply unit 41 for converting the electric power from a commercial power supply of, for example, AC 100V or the like into a direct current voltage of, for example, DC 5V or the like; a power supply interface 42 for supplying the direct current electric power from the AC/DC power supply unit 41 to a charging circuit of the portable telephone 13; a communication interface 43 for mediating a communication signal between the portable telephone 13; a channel coding unit 44 for carrying out signal processing that is necessary for transmission in an electric power line communication zone; a modulation/demodulation unit 45 for modulating and demodulating a signal; a filter unit 46 for removing a commercial power supply frequency of 50/60 Hz and frequencies other than the frequency band that is necessary for signal transmission; and a communication control unit 47 for controlling each part of the cradle 3 so that wired communication via the electric power line may be performed properly. In addition, the output of the modulation/demodulation unit 45 is connected to the signal quality detecting unit 28 shown in FIG. 4 and the quality level of a signal transmitted and received via the electric power line is detected by the signal quality detecting unit 28.

With reference to FIG. 4 and FIG. 5, the operations of wireless communication and wired communication by the portable telephone 13 will be described below. First, a case in which the portable telephone 13 is removed from the cradle 3 and is performing wireless communication will be explained with FIG. 2. In this case, the portable telephone 13 carries out the communication operation by itself with the configuration shown in FIG. 4. In FIG. 4, a signal that is inputted from the display unit 26 or the input/output unit 27 is subjected to some necessary data processing in the data processing unit 25. In this case, because the portable telephone 13 is separated from the cradle 3 shown in FIG. 5, if the signal quality detecting unit 28 detects that the quality level of a signal for wireless transmission or reception is at or above a certain level, the switch unit 24 switches the communication line to the wireless communication system under the control of the switch control unit 29.

Thus, the signal processed by the data processing unit 25 is transmitted to the channel coding unit 23 through the switch unit 24, and signal processing that is necessary for transmission in the wireless communication zone is carried out. In addition, the signal that exits the channel coding unit 23 is converted into an RF signal from a base band signal in the modulation/demodulation unit 22, and the RF signal is outputted wirelessly from the RF transmission/reception unit 21 via the antenna. On the other hand, an RF signal that is inputted from the antenna is received by the RF transmission/reception unit 21, and is converted from the RF signal to a base band signal in the modulation/demodulation unit 22. Further, the base band signal is subjected to signal processing that is necessary for wireless communication in the channel coding unit 23, is passed through the switch unit 24, and after being subjected to appropriate signal processing at the data processing unit 25, is allotted between the display unit 26 or the input/output unit 27. Such a flow of signal processing is appropriately processed in the communication control unit 30. Further, as a power supply of the portable telephone 13, the voltage of the electric power supplied from the secondary battery 32 is appropriately converted in the power supply unit 33 before being used. In addition, the power supply unit 33 is equipped with the power charge controller 34 for controlling the charging of the secondary battery 32.

Next, a case where, in FIG. 2, the portable telephone 13 is mounted on the cradle 3 and wired communication is performed via the electric power line will be explained. In this case, the communication operation is performed by connecting the communication interface 31 and the power supply interface 35 of the portable telephone 13 shown in FIG. 4 and the communication interface 43 and the power supply interface 42 of the cradle 3 shown in FIG. 5, respectively. In the cradle 3 shown in FIG. 5, the electric power from a commercial power supply, for example, of AC 100V or the like is converted into a desired DC voltage by the AC/DC power supply unit 41, and is then supplied to each part within the cradle 3. Further, the DC electric power outputted from the AC/DC power supply unit 41 is supplied to the secondary battery 32 via the power supply interface 42 and the power supply interface 35 shown in FIG. 4, and is then supplied from the secondary battery 32 as operational electric power and charging electric power for the portable telephone 13.

On the other hand, of the communication signal of the electric power line that is superimposed on a commercial power supply of, for example, AC 100V or the like, only the frequency band necessary for signal transmission passes through the filter unit 46, and the frequency components other than the frequency band necessary for signal transmission and the commercial power supply frequency of 50/60 Hz are eliminated. The signal that passes through the filer unit 46 is demodulated in the modulation/demodulation unit 45. In addition, after processing necessary for electric power line communication is carried out in the channel coding unit 44, this signal is transmitted to the portable telephone 13 via the communication interface 43.

Since the portable telephone 13 is connected to the cradle 3 shown in FIG. 5, the quality level of the signal to be transmitted or received by the electric power line is detected by the signal quality detecting unit 28 which is connected to the modulation/demodulation unit 45 via the communication interface 31, and if the quality of this signal is at or above a certain level, this information is sent to the switch control unit 29. The switch unit 24 switches the communication line to the electric power line communication system under the control of the switch control unit 29. Accordingly, the communication signal of the electric power line from the communication interface 43 of the cradle 3 is transmitted from the switch unit 24 to the data processing unit 25 via the communication interface 31 of the portable telephone 13. Then, this communication signal is processed in the data processing unit 25 into data that is appropriate for electric power line communication, and is allotted between the display 26 and the input/output unit 27. Such a flow of signal processing is appropriately processed in the communication control unit 30. Thus, when the portable telephone 13 shown in FIG. 4 is mounted on the cradle 3 shown in FIG. 5 to be charged, charging systems of the cradle 3 and the portable telephone 13 are connected to perform battery charging, while at the same time, the communication interfaces of the cradle 3 and the portable telephone 13 are connected such that data may be exchanged. In addition, the interface connection detector 36 is connected to both the communication interface 31 and the power supply interface 35, and this interface connection detector 36 judges whether or not the portable telephone 13 is mounted on the cradle 3.

Second Embodiment

Figure 3:
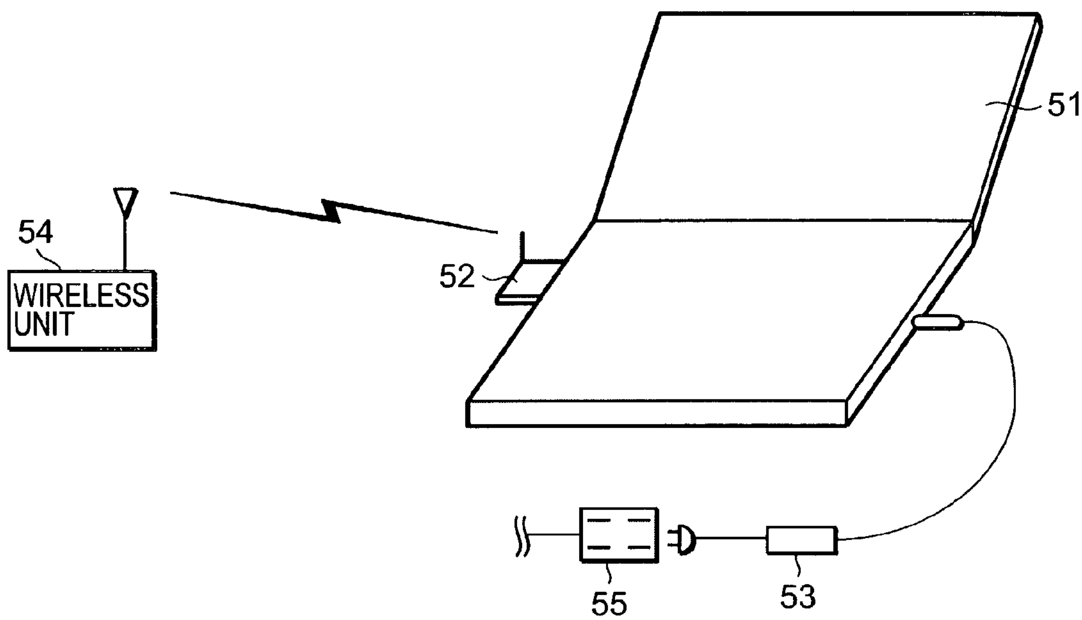
FIG. 3 is a conceptual diagram of a communication system for switching between wireless communication and wired communication using a personal computer with a built-in battery charging function in a second embodiment of the present invention.

FIG. 3 is a conceptual diagram of a communication system for switching between wireless communication and wired communication using a personal computer with a built-in battery charging function according to a second embodiment of the present invention. In other words, this drawing illustrates a concept of a communication system for switching a portable terminal equipped with a battery charging function, namely, a personal computer 51, between wireless communication and wired communication. The personal computer 51 has a wireless card 52 for performing wireless communication and an adapter 53 for charging. Accordingly, a cradle such as that described in the first embodiment is not present, and charging may be performed as required through the adapter 53. Since the wiring system beyond a socket 55 is the same as that in FIG. 2 described above, descriptions thereof are omitted.

When the personal computer 51 is in a normal in-use condition, wireless communication is performed between the wireless card 52 and a wireless unit 54. In addition, when the adapter 53 is plugged in the socket 55 to charge the personal computer 51, communication via the electric power line also becomes possible. In other words, the personal computer 51 may perform wired communication between itself and another personal computer (not illustrated) via the adapter 53 and the socket 55, and through the indoor electric power line and the optical fiber cable (not illustrated).

Figure 6:
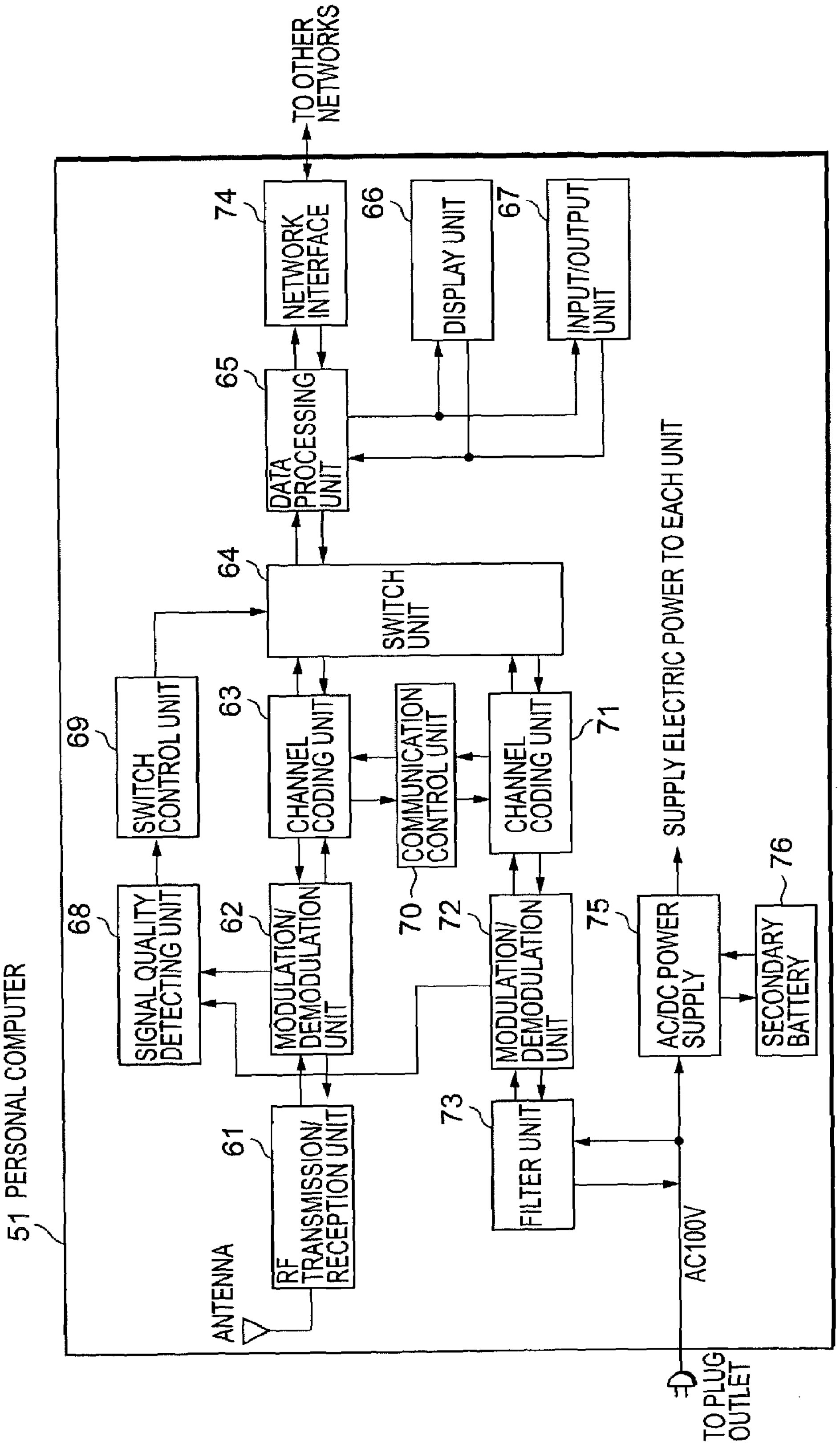
FIG. 6 is a block diagram indicating the inner configuration of the personal computer according to the second embodiment of the present invention.

FIG. 6 is a block diagram showing the inner configuration of the personal computer according to the second embodiment of the present invention. In other words, this drawing shows the configuration of a portable terminal communication device, such as a personal computer or the like equipped with both the functions of wireless communication and electric power line communication. In FIG. 6, the personal computer 51 includes a wireless communication system, an electric power line communication system, a power source system and common units.

The wireless communication system includes: an RF transmission/reception unit 61 for transmitting and receiving an RF signal via an antenna; a modulation/demodulation unit 62 for performing conversion processing between the RF signal and a base band signal; and a channel coding unit 63 for performing signal processing (for example, packetizing, multiplexing and scrambling) that is necessary for transmission in a wireless communication zone. The electric power line communication system includes: a channel coding unit 71 for performing signal processing that is necessary for transmission in an electric power line communication zone; a modulation/demodulation unit 72 for modulating and demodulating a signal; and a filter unit 73 for letting through only a frequency band required for signal transmission, and for eliminating a commercial power supply frequency of 50/60 Hz and frequencies other than the frequency band that is necessary for signal transmission. The power source system includes: a secondary battery 76 for supplying electric power to each part of the personal computer 51; and an AC/DC power supply 75 for converting the voltage of the electric power supplied from the secondary battery 76 to supply electric power to each part of the personal computer 51 and for controlling the charging of the secondary battery 76.

In addition, the common units include: a switch unit 64 for switching the communication line between the wireless communication system and the electric power line communication system; a data processing unit 65 for performing appropriate signal processing with respect to the base band signal; a display unit 66 for displaying the data that allotted from the data processing unit 65; an input/output unit 67 for inputting and outputting data; a signal quality detecting unit 68 for the detecting the quality level of a signal to be transmitted or received via the wireless line and a signal to be transmitted or received via the electric power line; a switch control unit 69 for controlling the switching operation of the switch unit 64 on the basis of the quality information of the signal level from the signal quality detecting unit 68; a communication control unit 70 for performing processing by controlling each part of the personal computer 51 such that communication is performed properly; and a network interface 74 for connecting to other networks through an optical fiber, ADSL, a wireless communication line or the like.

Next, the operations of wireless communication and wired communication by the personal computer 51 will be explained with reference to FIG. 6. First, a case where wireless communication is performed while the personal computer 51 is placed in a portable condition will be explained. In other words, when the AC/DC power supply 75 is not plugged into a socket (not shown), the signal quality detecting unit 68 detects the quality level of the signal to be transmitted or received via the wireless line. If the quality level of the signal is at or above a certain level, the switch unit 64 switches the communication line to the wireless communication system under the control of the switch control unit 69.

Then, the signal inputted from the antenna reaches the network interface 74 by following the same line as in the first embodiment shown in FIG. 4. In other words, the RF signal inputted from the antenna is received by the RF transmission/reception unit 61, and is converted from the RF signal into the base band signal in the modulation/demodulation unit 62. Further, the base band signal is subjected to signal processing that is necessary for transmission in wireless communication in the channel coding unit 63, passes through the switch unit 64, and after appropriate signal processing is performed at the data processing unit 65, is allotted to the display unit 66 or the input/output unit 67. In addition, the signal processed at the data processing unit 65 is transmitted to other networks via the network interface 74. Such a flow of signal processing is appropriately processed in the communication control unit 70. Since the flow of processing of the signal to be inputted from the display unit 66 or the input/output unit 67 and to be transmitted to the antenna side is the same as that shown in FIG. 4, an explanation thereof will be omitted.

Next, a case, in FIG. 3, where wired communication via the electric power line is performed by plugging the adapter 53 of the personal computer 51 in the socket 55 will be described. Of the communication signals of the electric power line that is superimposed on a commercial power supply of, for example, AC 100V or the like, only the frequency band necessary for signal transmission passes through the filter unit 73, and frequency components other than the frequency band necessary for signal transmission and the commercial power supply frequency of 50/60 Hz are eliminated. The signal which passes through the filer unit 73 is demodulated in the modulation/demodulation unit 72. In addition, processing necessary for communication via the electric power line is carried out in the channel coding unit 71. In this case, since the personal computer 51 is connected to the electric power line, the signal quality detecting unit 68 detects the quality level of the signal to be transmitted or received via the electric power line. If the quality level of the signal is at or above a certain level, the switch unit 64 switches the communication line to the electric power line communication system under the control of the switch control unit 69.

Accordingly, the communication signal is transmitted from the switch unit 64 to the data processing unit 65. Then, this communication signal is processed in the data processing unit 65 into data that is appropriate for communication via the electric power line, and is allotted to the display 66 or the input/output unit 67. In addition, the signal processed in the data processing unit 65 is transmitted to other networks via the network interface 74. Such a flow of signal processing is appropriately processed in the communication control unit 70. The network interface 74 is connected to other networks, such as an optical fiber, ADSL, a wireless communication or the like. Thus, the switching between wireless communication and communication by the electric power line is done by the switch unit 64. In other words, the switch unit 64 determines to which of the wireless and the electric power line the signal from the network interface 74 should be supplied, or which of the wireless signal system and the electric power line signal system should be prioritized. Since the charging control of the secondary battery 76 by the AC/DC power supply 75 and the control of the electric power to be supplied to each part are the same as the first embodiment shown in FIG. 5, an explanation thereof will be omitted.

Figure 7:
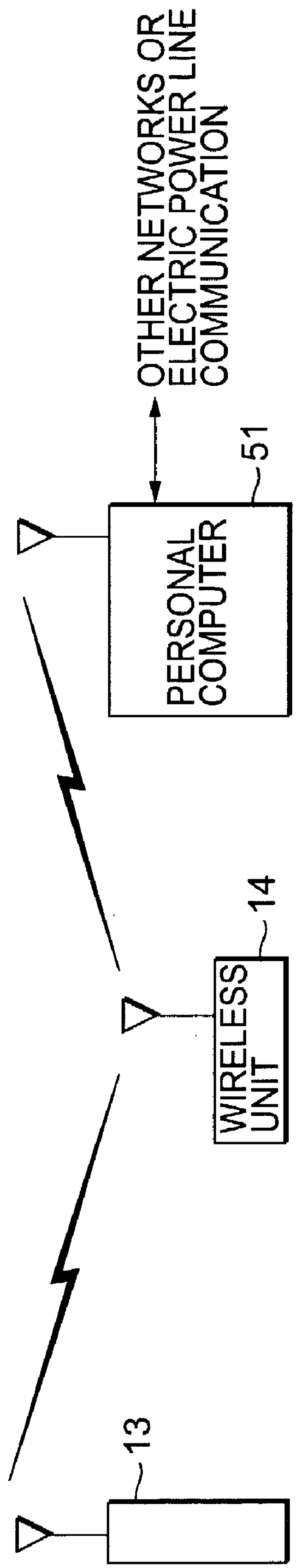
FIG. 7 is a conceptual diagram illustrating wireless communication by the portable telephone and the personal computer.
Figure 8:
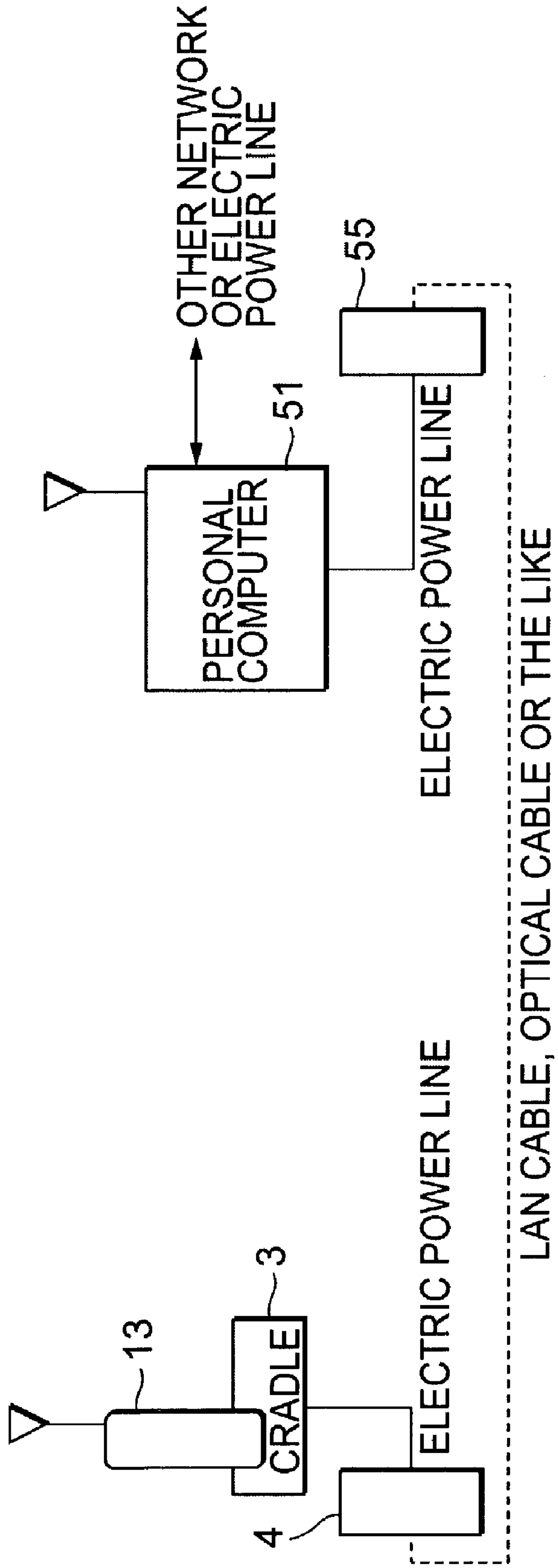
FIG. 8 is a conceptual diagram of electric power line communication by the portable telephone and the personal computer.

Next, a specific embodiment for switching data communication between communication devices between wireless communication and wired communication will be explained below. For example, a case in which communication is performed by switching between the wireless line and the electric power line by way of communication between the portable telephone 13 having the cradle 3 according to the first embodiment as shown in FIG. 2 and the personal computer 51 with the built-in charging function according to the second embodiment as shown in FIG. 3 will be explained. FIG. 7 is a conceptual diagram of wireless communication by the portable telephone and the personal computer, and FIG. 8 is a conceptual diagram of electric power line communication by the portable telephone and the personal computer. First, as shown in FIG. 7, the portable telephone 13 and the personal computer 51 perform wireless communication via the wireless unit 14, and the personal computer 51 communicates with other communication devices via some other network or the electric power line.

Then, as shown in FIG. 8, when the portable telephone 13 is mounted on the cradle 3, the electric power line connected to the cradle 3 and the electric power line connected to the personal computer 51 are connected via a LAN cable, an optical fiber cable or the like. Then, it is negotiated whether or not electric power line communication is possible between the portable telephone 13 and the personal computer 51. In this case, if electric power line communication is possible between the portable telephone 13 and the personal computer 51, switching from wireless communication to electric power line communication takes place, and electric power line communication between the portable telephone 13 and the personal computer 51 is executed. Naturally, in this case, the personal computer 51 is capable of communicating with other communication devices via some other network or the electric power line. In addition, when the portable telephone 13 is removed from the cradle 3 during communication between the portable telephone 13 and the personal computer 51 via the electric power line, if wireless communication is possible, switching to wireless communication takes place. Further, since untransmitted data which is generated during switching is transmitted after switching to wireless communication, continuity of the communication data may be maintained.

As described above, according to the communication systems of the first and the second embodiments, the communication terminal, such as the portable telephone, the personal computer or the like, is provided with the electric power supplying means, such as the cradle, the adapter or the like, for charging electric power for communication. The communication terminal is configured such that communication between the communication terminal and the communication partner is performed by switching between the wireless communication system for performing communication by transmitting a radio signal and the wired communication system for performing communication by transmitting a signal through the electric power line for supplying electric power to the electric power supplying means. In addition, the communication terminal may also include the signal quality detecting means for detecting the signal quality of the respective communication systems and judging whether or not the respective communication systems are usable, and switch means for switching the communication system between the wireless communication system and the wired communication system on the basis of the judgment result from the signal quality detecting means. Further, the communication terminal may include untransmitted data transmitting means for judging whether or not untransmitted data was present during the process of switching systems by the switch means, and for transmitting the untransmitted data after switching the untransmitted data after the switching of the communication systems in the event that untransmitted data exists.

In addition, in the communication terminal, the signal quality detecting unit 28 determines whether or not the communication partner connected to the wireless communication system is able to use the wired communication system when the electric power supplying means is connected to the electric power line and is charging during communication via the wireless communication system. Then, if the signal quality detecting unit 28 judges that communication by the wired communication system with the communication partner is possible, the communication terminal negotiates with the communication partner to switch the communication system from the wireless communication system to the wired communication system. In addition, if the signal quality detecting unit 28 judges that communication via the wired communication system with the communication partner is not possible, some other line of an electric power line is selected in accordance with a predefined routing rule, and the communication system is switched from the wireless communication system to the wired communication system using the selected line of the electric power line.

Figure 9:
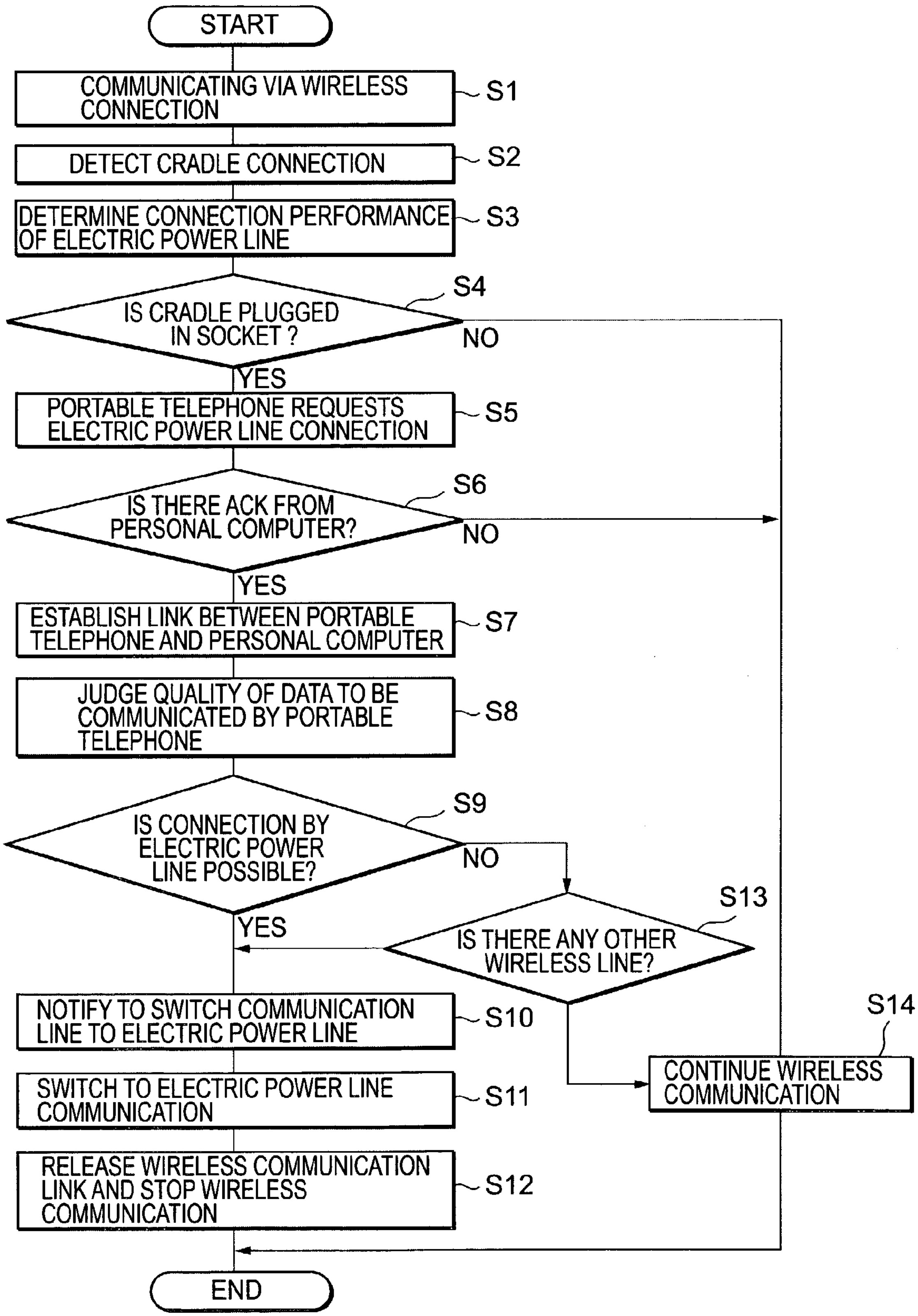
FIG. 9 is a flow chart indicating the flow of operation when the portable telephone is mounted on the cradle during wireless communication.

Next, an operational flow for switching between wireless communication and electric power line communication between the communication devices will be explained in detail below with reference to a flow chart. First, an operational flow for switching from wireless communication to electric power line communication by mounting the portable telephone on the cradle will be described. FIG. 9 is a flow chart for showing an operational flow when the portable telephone is mounted on the cradle during wireless communication. In other words, this flow chart shows an operational flow in a condition where, as shown in FIG. 8, the power supplies of the cradle 3 for the portable telephone and of the personal computer 51 are both connected to the electric power line, and the cradle 3 and the personal computer 51 are able to communicate with each other via the electric power line.

When the portable telephone 13 is not connected to the cradle 3, in other words, when no charging is taking place, the portable telephone 13 is operating on the electric power from the built-in secondary battery, and the interfaces are not connected between the portable telephone 13 and the cradle 3, the portable telephone 13 is performing wireless communication with the personal computer 51 using the wireless communication function (step S1). In this case, radio wave resources are occupied in terms of frequency and time in the space surrounding the portable telephone 13 and the personal computer 51.

When the portable telephone 13 is mounted on the cradle 3, the interface connection detector 36 detects that the portable telephone 13 is connected to the cradle 3 (step S2), enables the interface between the portable telephone 13 and the cradle 3, initializes an electric power line communication function within the cradle 3, and determines the connection performance of the electric power line (step S3). During this period, the wireless communication function is active, and wireless communication between the portable telephone 13 and the personal computer 51 is taking place. In this case, the signal quality detecting unit 28 judges, for example, whether or not the cradle 3 is plugged in the socket, and thus whether or not the electric power line communication system is physically formed (step S4). If the electric power line communication system is formed (step S4 is satisfied), the portable telephone 13 requests an electric power line connection of the cradle 3 (step S5).

Then, the signal quality detecting unit 28 judges whether or not there is an ACK (Acknowledge: affirmative response) from the personal computer. In other words, an inquiry as to whether or not electric power line communication is possible for the communication partner in wireless communication (the personal computer 51) is made, and it is judged whether or not the response thereof is affirmative (step S6). If a response that electric power line communication is possible is obtained (step S6 is satisfied), a link for electric power line communication is established between the portable telephone 13 and the personal computer 51 according to a predetermined protocol, and reception level, bit pattern, error rate or the like is/are measured (step S7). Thus, once the electric power line communication link is established, the signal quality detecting unit 28 judges the quality level of the data to be communicated (step S8). Based on the result thereof, the signal quality detecting unit 28 judges whether or not the quality of the communication data is good and connection via the electric power line is possible (step 9). In this case, if connection via the electric power line is possible (step S9 is satisfied), the signal quality detecting unit 28 notifies the switch unit 24 via the switch control unit 29 to switch the communication line to the electric power line communication system (step S10). Once it is switched to electric power line communication (step S11), the wireless communication link is released to stop wireless communication (step S12), and thereafter, electric power line communication is continued (end).

On the other hand, in the process described above, if the cradle 3 is not plugged in the socket 4 in step 4 (step S4 is not satisfied), there is no ACK from the personal computer 51 in step S6 (step S6 is not satisfied), or it is judged that connection via the electric power line is not possible (step S9 is not satisfied), in other words, if the communication partner communicating with the portable telephone 13 is not equipped with electric power line communication functions, is currently unable to perform electric power line communication, or it is judged for some reason that the communication partner is unable to communicate via the electric power line, it is determined whether or not there is some other electric power line communication line (step S13). If there is another electric power line communication line (step S13 is satisfied), the flow proceeds to step S10, and the communication line is switched to the electric power line. If there is no other electric power line communication line (step S13 is not satisfied), the flow proceeds to step S14, and wireless communication is continued as it is. The negotiation operation for electric power line communication described above may be conducted periodically while the portable telephone 13 is connected to the cradle 3. Alternatively, the negotiation operation may be conducted in connection with changes in the communication condition such as fluctuations in data traffic.

Figure 10:
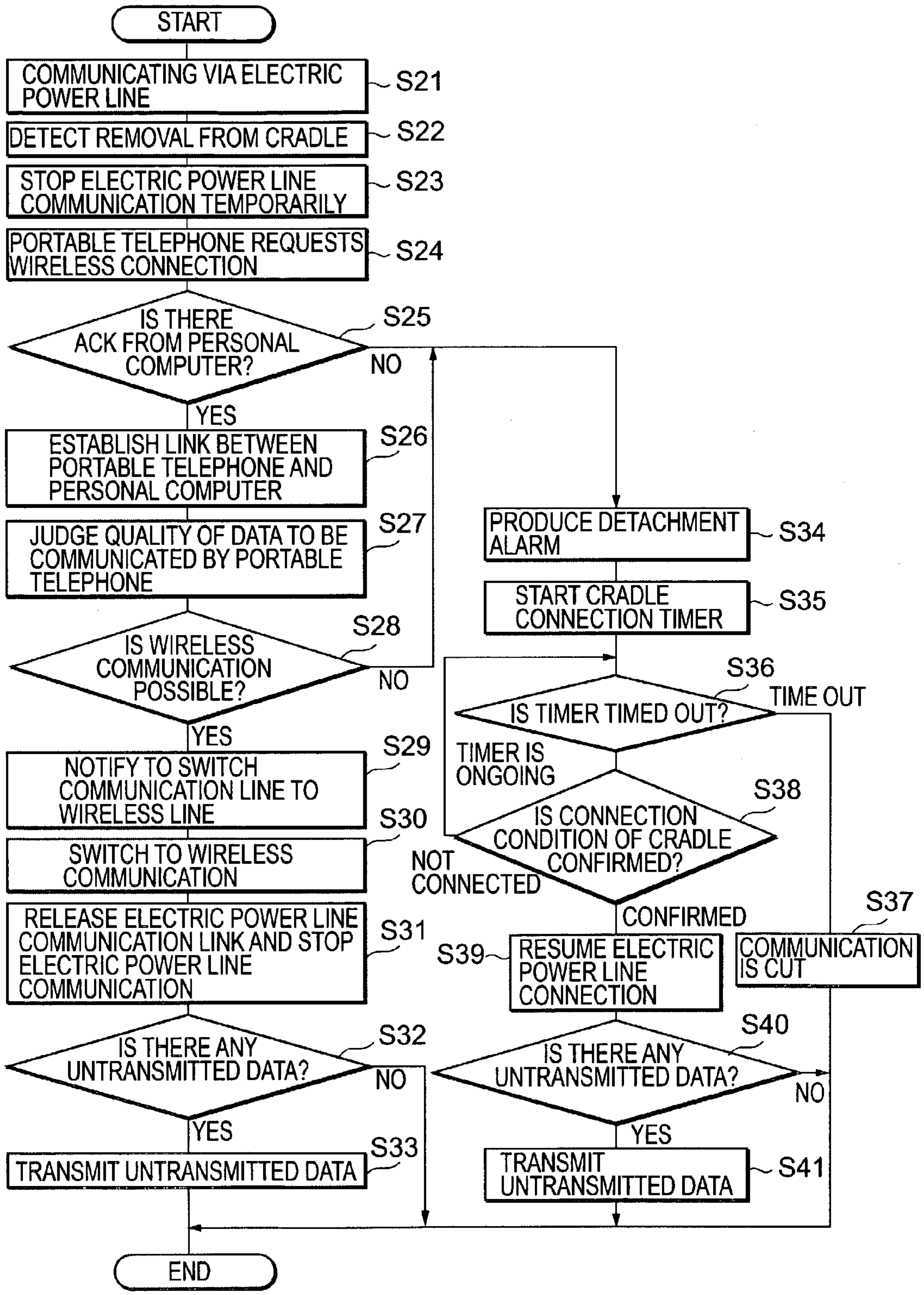
FIG. 10 is a flow chart indicating the flow of operation when the portable telephone is removed from the cradle during electric power line communication.

Next, an operational flow of removing the portable telephone from the cradle and switching from electric power line communication to wireless communication will be explained below. FIG. 10 is a flow chart indicating an operational flow of when the portable telephone is removed from the cradle during electric power line communication. In FIG. 10, when the portable telephone 13 is mounted on the cradle 3 and communication via an electric power line connection is being performed (step S21), if the interface connection detector 36 detects that the portable telephone 13 is detached from the cradle 3 (step S22), the portable telephone 13 temporarily stops communication via the electric power line (step S23), and requests a connection of wireless communication to the communication partner (the personal computer 51) with whom electric power line communication was being performed immediately before (step S24). During this period, data exchange between the cradle 3 and the personal computer 51 is stopped temporarily, however, the link is maintained so that communication may be resumed any time.

Then, the portable telephone 13 judges whether or not there is an ACK from the personal computer. In other words, an inquiry as to whether or not wireless communication is possible is made to the communication partner currently in communication via the electric power line (the personal computer 51), and it is judged whether or not the response is positive (step S25). If there is a response to the request for wireless connection that wireless communication is possible (step S25 is satisfied), a wireless communication link is established between the portable telephone 13 and the personal computer 51 in accordance with a predetermined protocol, and the reception level, the bit pattern, the error rate or the like is/are measured (step S26). Thus, after the wireless communication link is established, the portable telephone 13 judges the quality level of the data to be communicated (step S27). Then, the portable telephone 13 judges whether or not the quality of the communication data is good and wireless communication connection is possible (step 28).

Here, if a wireless connection is possible (step S28 is satisfied), the signal quality detecting unit 28 notifies to switch the communication line to the wireless line (step S29). Once it is thus shifted to wireless communication (step S30), the electric power line communication link is released, and electric power line communication is stopped (step S31). In addition, it is judged whether or not there is untransmitted data generated in the course of switching from electric power line communication to wireless communication (step S32). If there is untransmitted data (step S32 is satisfied), the untransmitted data is transmitted (step S33), and wireless communication is continued (end). Naturally, if there is no untransmitted data in step S32 (step S32 is not satisfied), electric power line communication is continued (end).

On the other hand, in step S25, if there is no ACK from the personal computer (step S25 is not satisfied) or if, in step S28, there is a response to the request for wireless connection that a wireless connection is not possible (step S28 is not satisfied), the portable telephone 13 produces, for example, a message notifying a user that wireless communication cannot be performed and prompting the user to return the portable telephone to the cradle in order to continue communication, or a detachment alarm (by sound, vibration or the like) (step S34). In addition, when the alarm is produced, a cradle connection timer is started simultaneously (step S35). Then, it is judged whether or not the timer has timed out (step S36). If the timer times out before the portable telephone 13 is returned to the cradle 3, in other words, if the portable telephone 13 is not returned to the cradle 3 even after a certain period has elapsed and wireless communication is not possible either, communication is cut entirely by cutting the link between the cradle 3 and the personal computer 51 (step S37).

On the other hand, if the timer is ongoing in step S36, it is judged whether or not it has been confirmed if the connection condition of the cradle 3 on which the portable telephone 13 is mounted is good (step S38). If the connection condition is not good and is in an unconnected condition, the process returns to step S36, and it is confirmed again whether or not the timer has timed out. Thus, if the portable telephone 13 is returned to the cradle 3 within a certain period, in other words, if the result of the connection confirmation is fine, communication is resumed using the electric power line whose link was maintained in step S24 (step S39). At this point, it is judged whether or not there is any untransmitted data generated in the process before resuming electric power line communication (step S40). If there is untransmitted data (step S40 is satisfied), the untransmitted data is transmitted (step S41) and communication via the electric power line is continued (end). Naturally, if there is no untransmitted data in step S40 (step S40 is not satisfied), communication via the electric power line is continued (end).

With such a procedure, a smooth transition between communication via a wireless line and communication via the electric power line becomes possible. In addition, in a communication switching system such as that described above, because it is possible to effectively perform a switch between the wireless and the electric power line communication systems, it is possible to realize communication which effectively utilizes wireless communication resources while eliminating unnecessary wireless communications. For example, even in a system lacking in wireless communication resources such as a wireless LAN or the like, it is possible to effectively utilize the wireless communication resources thereof.

The embodiments described above are merely examples for explaining the present invention, the present invention is not limited to the embodiments above, and various modifications of the present invention are possible without departing from the scope and spirit of the present invention. For example, when a communication failure occurs in the wireless communication system due to interference from other communication systems, it is also possible to automatically switch to the wired communication system via the electric power line by connecting the communication terminal to the electric power supplying means. In addition, it is also possible to switch to the wired communication system by connecting the communication terminal to the electric power supplying means within a predetermined period from an occurrence of a communication failure in the wireless communication system. Thus, even when it becomes difficult to continue wireless communication due to interference from other communication systems or the like, it is possible to secure stable communication constantly by switching from wireless communication to electric power line communication.

In addition, as an example of an application of the wireless/wired communication system according to an embodiment of the present invention, the following system may be considered. First, it is possible to configure a system such that a network interface of the wireless/wired communication system is electric power line communication. In other words, it is possible to configure a system in which the network interface of the wireless/wired communication system is an electric power line interface of a multi-access system and which is capable of communicating with both the cradle and the external network using a single interface. In addition, in a system in which the outside network is an electric power line, for example, means for accessing the electric power line may be mounted on an electric pole outside, the Internet or the like may be accessed therefrom by using an external interface (for example, an optical fiber or the like). The idea of such a system is illustrated in FIG. 2. In this case, because it is possible to communicate using just the wiring of existing electric power lines at home, installation costs are low, and there is little risk of it being unaesthetic.

Secondly, it is possible to configure a system in which the communication partner with whom wireless communication is done is a public wireless access outdoors. In this case, in the procedure for switching between communication systems, a logical hand over at an upper layer of communication, such as an IP protocol or the like, is carried out. In this procedure, in switching the communication means to electric power line communication, a switching including not only a switching of the communication link but also a switching of the communication line at the upper layer is carried out. Third, it is possible to configure a system in which the cradle and the wireless/wired communication devices are integrated. This system is similar to the first application example, and the cradle directly communicates with an electric power line access point that is installed outside. In addition, if it becomes difficult to continue wireless communication due to interference from other wireless communication systems or the like, it is possible to secure stable communication by switching from wireless communication to electric power line communication.

Attention should be brought to the fact that wireless LAN systems and electric power line carrier communication systems used in the home and in offices have the following problems. Wireless LAN systems have a problem in that signals are attenuated and it becomes difficult for radio waves to travel when the distance across rooms is large and there are obstacles such as walls or furniture, or in that the propagation condition of the radio waves is constantly changing due to movements of people. In order to mitigate these problems, fallback Systems for lowering the transmission rate by changing the modulation system or the encoding rate, or antenna diversity systems in which transmission antennas or reception antennas are switched, or other like systems are adopted. However, because a fall back circuit or a diversity circuit must be added in order to adopt such systems, the overall circuit configuration of the system becomes complex.

On the other hand, electric power line carrier communication systems have a problem in that the impedance of the line drops or in that the noise of the line increases as a result of the increased number of devices connected to the electric power line, or depending on the kind of devices that are connected. In addition, there is a possibility that the attenuation of the propagated signal becomes larger between outlets of differing wiring systems, such as between an outlet to be connected to the U and V phases and an outlet to be connected to the V and W phases of a three-phase, two-wire system. As such, in order to mitigate these problems, fall back systems or the like for reducing the transmission rate by changing the modulation system and the encoding rate are adopted, however, there is a problem in that the overall circuit configuration of the system becomes complex, and the device becomes larger, for example. In order to solve or mitigate these problems, a communication system according to a third embodiment will be explained below.

Third Embodiment

A communication system according to a third embodiment relates to a communication system which is provided with both a wireless LAN communication system and an electric power line carrier communication system, and which switches between these communication modes in accordance with communication conditions (hereinafter, referred to as communication quality levels). In addition, the term communication mode refers to the respective communication systems and their transmission rates in combination. Since it is generally unlikely that stable communication conditions may be secured for both the wireless LAN and electric power line carrier communication at the same time, when the communication quality level of either communication system becomes low, communication is performed by switching to the communication mode of the communication system having the higher communication quality level. In this case, the communication quality level which is taken as a criterion for judging whether to switch communication modes may include throughput, noise level, delay profile, dip point at respective frequencies, packet error rate (PER) and bit error rate (BER) or a pressing of a button or the like.

The communication system according to the third embodiment may include judging means for taking in the communication quality levels of both the communication systems of the wireless LAN and the electric power line carrier communication system and judging which communication mode should be employed without distinguishing between the communication systems, be it the wireless LAN or the electric power line carrier communication system. For example, if throughput, which is data transmission amount per unit time, is to be used as the criterion for judging whether to switch communication modes, the average value of throughput shift for each communication mode calculated based on measurements of past and present throughputs is recorded in a measurement data table. Then, communication is performed by selecting the communication mode having the highest average value of throughput shift among the average values of throughput shift recorded in the measurement data table.

Further, according to an embodiment of the communication system of the present invention, it is also possible to switch to a wireless communication system including Bluetooth™, UWB (Ultra Wideband) systems or the like in addition to the wireless LAN, or to a wired communication system including coaxial cable communication, telephone line communication or the like in addition to electric power line carrier communication. However, in the following embodiments, for purposes of simplicity, an operation of switching between the wireless LAN and electric power line carrier communication will be explained.

Figure 11:
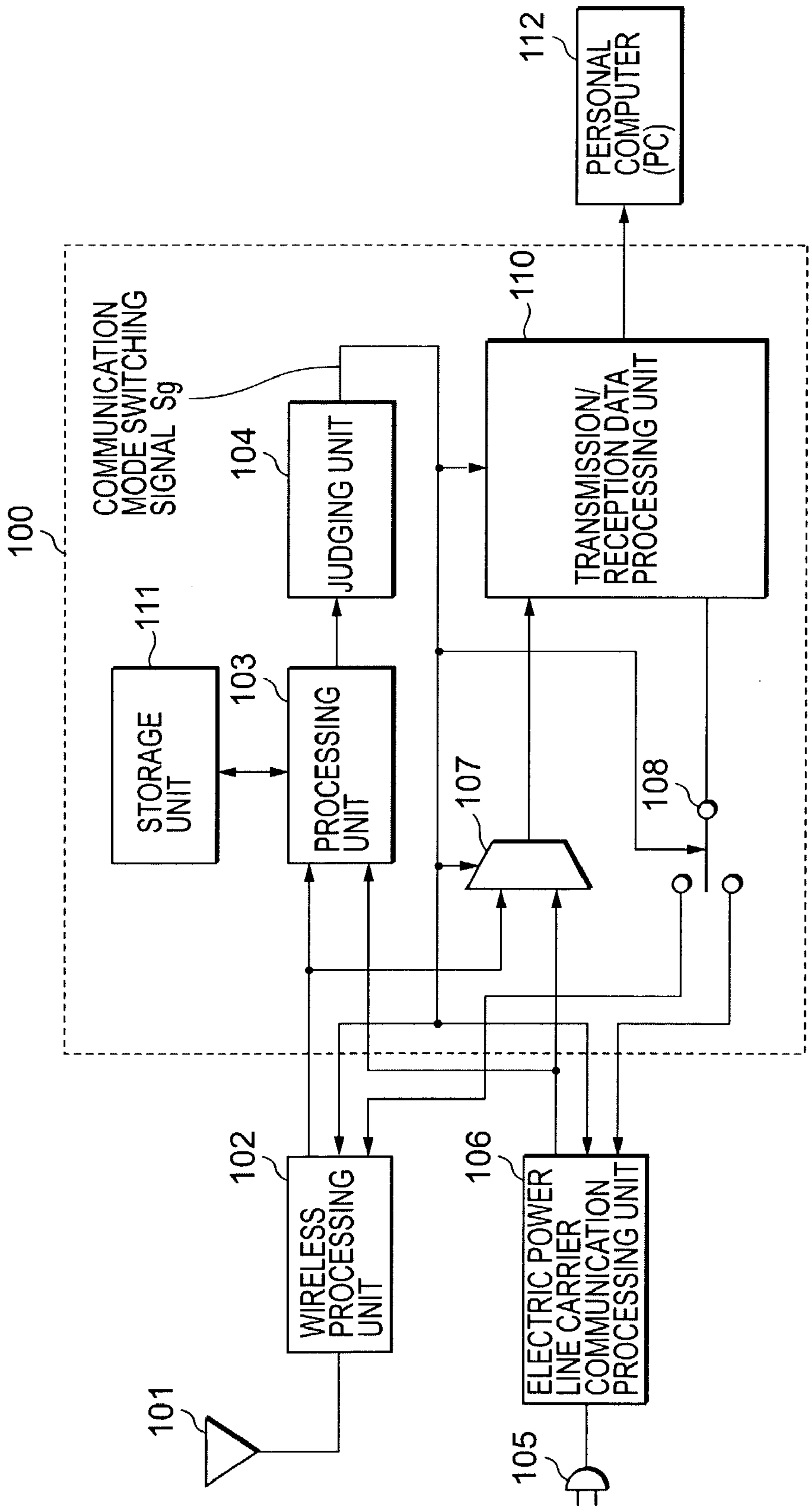
FIG. 11 is a configuration diagram of a communication device according to a third embodiment of the present invention for switching between a wireless LAN and electric power line carrier communication depending on the communication quality level.

First, the configuration of a communication device for switching between the wireless LAN and electric power line carrier communication in accordance with communication quality levels thereof according to the communication system of the third embodiment will be described. FIG. 11 is a configuration diagram of the communication device for switching between the wireless LAN and electric power line carrier communication in accordance with the communication quality levels thereof according to the third embodiment of the present invention. In FIG. 11, in addition to a communication system switching processing unit 100 indicated with broken lines, there are shown, on the input side, a wireless communication system including a wireless LAN antenna 101 and a wireless processing unit 102, and a wired communication system including a plug 105 and an electric power line carrier communication processing unit 106, and on the output side, a personal computer (PC) 112 serving as a load. An explanation encompassing these parts will be given below.

The communication system switching processing unit 100 includes a processing unit 103 for calculating an average value of shift on the basis of a plurality of past measurements for each communication mode, a judging unit 104 for judging and selecting the optimum communication mode from the average values of shift, a reception data switching unit 107 for switching between reception data from the wireless processing unit 102 and reception data from the electric power line carrier communication processing unit 106, a transmission data switching unit 108 for switching between data to be transmitted to the wireless processing unit 102 and data to be transmitted to the electric power line carrier communication processing unit 106, a transmission/reception data processing unit 110 for modulating and demodulating the data transmitted and received to and from the personal computer (PC) 112 and a storage unit 111 for storing a plurality of previous measurement data for each communication mode and storing as a table an initial value and an average value of shift. In the drawing, Sg is a communication mode switching signal.

The operation of each device and each unit shown in FIG. 11 will be described in detail. The communication system switching processing unit 100 selects either the wireless LAN or electric power line carrier in accordance with a communication mode switching signal Sg outputted from the judging unit 104. If the judging unit 104 selects the wireless LAN, the optimum transmission rate in the wireless LAN is selected. On the other hand, if the judging unit 104 selects the electric power line carrier, the optimum transmission rate in the electric power line carrier is selected.

The processing unit 103 calculates the average value of shift on the basis of a plurality of previous measurement data stored in the storage unit 111 and a current measurement data and stores the result in the storage unit 111. In its default state, the storage unit 111 stores an initial data value in the measurement data table. In this case, the initial data value is data that is set at design and used upon installation of the communication system. The judging unit 104 selects the optimum communication mode on the basis of the average value of shift corresponding to each communication mode and recorded in the measurement data table of the storage unit 111. Further, the reception data switching unit 107 switches the reception data from the wireless processing unit 102 or the electric power line carrier communication processing unit 106 to the transmission/reception data processing unit 110 on the basis of the communication mode switching signal Sg outputted from the judging unit 104. The transmission data switching unit 108 switches the transmission data from the transmission/reception data processing unit 110 to the wireless processing unit 102 or the electric power line carrier communication processing unit 106. The transmission/reception data processing unit 110 transmits and receives a signal to and from the personal computer (PC) 112 by performing transmission and reception processing such as modulation, demodulation or the like.

According to a communication system such as that of the third embodiment shown in FIG. 11, by using a wireless LAN communication system and an electric power line carrier communication system, and switching the communication modes seamlessly in accordance with the switching judging criteria of various communication quality levels, it becomes possible to perform communication with an optimum communication efficiency at all times. As described above, for the various communication quality levels which may be used as the criteria for judging whether to switch communication modes, throughput, noise level, delay profile, dip points across frequencies, packet error rate, bit error rate, pressing of a button or the like may be used. For each of the communication quality levels, a case in which the respective communication quality level is used as the criterion for judging whether to switch communication modes will be described in detail below.

<Throughput>

First, a case in which throughput, which is data transmission amount per unit time, taken as the criterion for judging whether to switch communication modes will be described below. If throughput is used as the criterion for judging whether to switch, the processing unit 103 calculates the average value of throughput shift on the basis of a plurality of previous and present throughput measurements of the respective communication modes. Then, the calculated average values of throughput shift are stored in the storage unit 111 as a measurement data table. In switching between communication modes, the judging unit 104 compares the average values of throughput shift of the respective communication modes in the measurement data table, selects the communication mode having the highest average value of throughput shift, and switches the communication mode thereto.

FIG. 12 is an example of the measurement data table when throughput is used as the criterion for judging whether to switch between communication modes. In the measurement data table shown in FIG. 12, for each communication mode, an average value of throughput shift calculated on the basis of a plurality of throughput measurements taken immediately before performing the switching judging by throughput, as well as an initial value set upon installation of the communication system or at the time of resetting the communication are stored. In addition, if there are no or not enough throughput measurements preceding the judgment, the initial value of throughput is substituted for the missing values in calculating the average value of throughput shift. The unit of the average throughput shift value and the throughput initial value is Mbps.

For the communication modes, the communication systems of the wireless LAN and the electric power line representing electric power line carrier communication are indicated, a plurality of nominal rates are shown for each communication system. For example, "wireless LAN 6 Mbps" and "wireless LAN 36 Mbps" for the wireless LAN communication system and "electric power line 6 Mbps" and "electric power line 36 Mbps" for the electric power line communication system or the like are indicated.

In the measurement data table shown in FIG. 12, the average value of throughput shift of 13.3 Mbps corresponding to the communication mode of "electric power line 20 Mbps" is the highest value. Accordingly, the judging unit 104 selects and switches to the communication mode of "electric power line 20 Mbps" which is the communication mode with the highest average value of throughput shift. In this case, for example, if the communication mode of "electric power line 20 Mbps" is congested, because communication modes of the electric power line are not usable, the judging unit 104 selects and switches to the communication mode having the highest average value of throughput shift in the wireless LAN system, namely in this case, "wireless LAN 18 Mbps" which has an average value of throughput shift of 11.8 Mbps.

Next, the switching operation of the communication system switching processing unit 100 when the average value of throughput shift is used as the criterion for judging whether to switch between communication modes will be explained below with reference to FIG. 11. First, the reception operation will be described. A signal received from the wireless LAN antenna 101 is processed by the wireless processing unit 102, and is outputted as reception data and communication quality level data. On the other hand, a signal received from the plug 105 via a power cord is processed by the electric power line carrier communication processing unit 106, and is outputted as reception data and communication quality level data. In this case, the communication quality level data includes throughput information indicating data transmission amount.

Either the reception data outputted from the wireless processing unit 102 or the reception data outputted from the electric power line carrier communication processing unit 106 is selected by the reception data switching unit 107, and is transmitted to the transmission/reception data processing unit 110. Both the communication quality level data outputted from the wireless processing unit 102 and the communication quality level data outputted from the electric power line carrier communication processing unit 106 are transmitted to the storage unit 111 via the processing unit 103. The storage unit 111 saves previous throughput measurement data in the measurement data table as the communication quality level data for each communication mode.

In the other words, in the storage unit 111, a plurality of previous throughput measurement data are stored along with information on the time at which these data were obtained for each communication mode. Each time a throughput measurement data is inputted in the storage unit 111, the oldest throughput measurement data is discarded. The processing unit 103 processes, for example, ten previous throughput measurement data for each communication mode, and has the result stored in the storage unit 111 as an average value of throughput shift. A representative value of throughput for each communication mode determined at the time of design is recorded as the initial value of throughput. Although it is possible to record, as described above, the representative value at the time of communication system design as the representative value of throughput, the representative throughput value may also be set to a throughput value based on a data transmission amount which takes the usage condition of the communication system into consideration. In addition, an average value of throughput shift which has outlasted a predetermined expiry time is discarded and is replaced with a new throughput initial value. In addition, all average values of throughput shift in the measurement data table shown in FIG. 12 may be reset to their initial values by a reset signal from an upper layer.

The average value of throughput shift for each communication mode outputted from the processing unit 103 is sent to the judging unit 104. The judging unit 104 judges the optimum communication mode at each switching timing of the communication mode (hereinafter, referred to as a communication mode switching period), and outputs the judgment result as the communication mode switching signal Sg. According to the example shown in FIG. 12, because the average value of throughput shift when the communication mode is "electric power line 20 Mbps" is the largest value at 13.3 Mbps, the judging unit 104 outputs a communication mode switching signal Sg for selecting the communication mode of "electric power line 20 Mbps".

In addition, there may also be cases in which the communication mode is altered in accordance with a communication mode alteration request from the communication partner. The communication mode alteration request from the communication partner is carried out by a communication mode alteration request packet or the like. If this communication mode alteration request packet is received via the antenna 101, the communication mode alteration request packet is processed by the wireless processing unit 102, and is outputted as the communication quality level data. In addition, if this communication mode alteration request packet is received via the plug 105, the communication mode alteration request packet is processed by the electric power line carrier communication processing unit 106, and is outputted as the communication quality level data. These communication quality level data go through the processing unit 103, are judged by the judging unit 104, and are outputted as the communication mode switching signals Sg. Then, these communication quality level data are used in altering the communication mode after a negotiation with the communication partner.

Next, a transmission operation when the average value of throughput shift is used as the criterion for judging whether to switch will be explained below. A signal outputted from the personal computer (PC) 112 is processed by the transmission/reception data processing unit 110 as transmission data in accordance with the communication mode specified by the communication mode switching signal Sg. In other words, the transmission data processed by the transmission/reception data processing unit 110 is outputted to the wireless processing unit 102 or the electric power line carrier communication processing unit 106 via the transmission data switching unit 108. Then, the transmission data of the wireless processing unit 102 is outputted to the network via the antenna 101 and the transmission data of the electric power line carrier communication processing unit 106 is outputted to the network via the plug 105.

Figure 13:
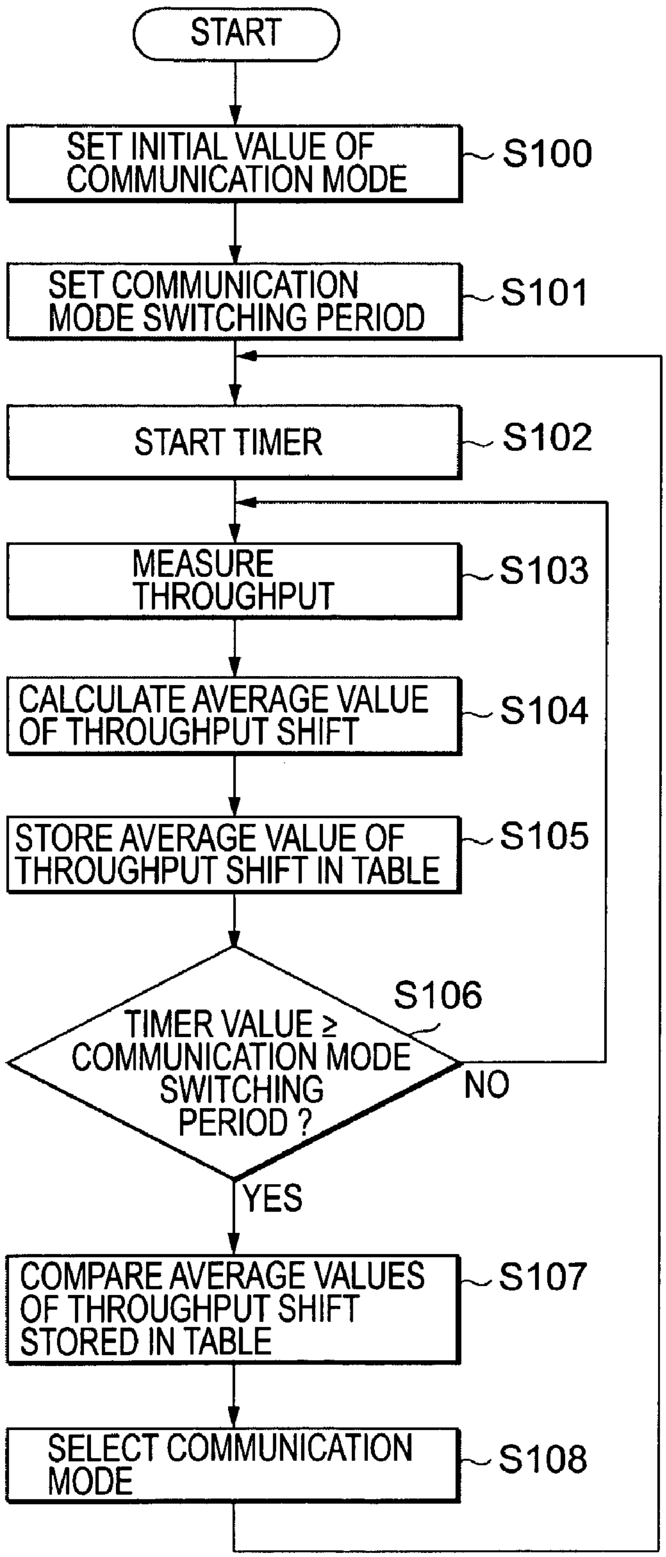
FIG. 13 is a flow chart indicating the operation for switching communication modes using throughput as a criterion for judging the communication quality level.

A processing flow for switching between communication modes in accordance with the communication quality level will be explained with reference to a flow chart. FIG. 13 is a flow chart illustrating the operation for switching the communication mode taking throughput as a criterion for judging the communication quality level. First, in step S100, initial values of the communication modes are set. In other words, the initial value corresponding to each communication mode is stored in the measurement data table shown in FIG. 12. Then, the communication mode switching period is set (step S101). At intervals of this switching period, switching to the optimum communication mode is performed. At this point, a timer for counting this switching period is started (step S102).

In order to find the communication quality level of the present communication mode, the throughput, which is the data transmission amount in a fixed period of time, is measured (step S103). Then, an average value of throughput shift is obtained from a plurality of previous throughput measurements including the present throughput measurement. For example, an average value of throughput shift is obtained from ten throughput measurements including the present throughput measurement and nine previous throughput measurements (step S104). Then, the obtained average value of throughput shift is stored at a position in the measurement data table corresponding to the relevant communication mode (step S105).

Then, it is judged whether or not the value of the timer has reached the communication mode switching period (value of timer≧communication mode switching period?) (step S106). If the value of the timer has not reached the communication mode switching period (step S106 is not satisfied), the process returns to step S102, and the average value of throughput shift is obtained on the basis of a plurality of immediately preceding throughput measurements while continuing communication until the value of the timer reaches the communication mode switching period. The obtained average value of throughput shift is stored in the storage unit 111 each time (steps S102 through S105).

On the other hand, in step S106, if the value of the timer reaches the communication mode switching period (step S106 is satisfied), the average values of throughput shift of the respective communication modes stored in the measurement data table are compared (step S107). Then, the communication mode having the highest average value of throughput shift is selected (step S108). Thereafter, the process returns to step S102, and performs communication mode switching by selecting the optimum communication mode based on the average values of throughput shift at intervals of the switching period set by the timer.

In the flow chart shown in FIG. 13, an operation for discarding a throughput initial value which has outlasted an expiry time and replacing it with a predetermined representative value, and an operation for resetting the measurement data table to the initial value with the reset signal from the upper layer is not described.

<Noise Level>

An operation when noise level is used as the criterion for judging whether to switch between communication modes will be explained below. FIG. 14 is an example of a measurement data table when noise level is used as the criterion for judging whether to switch between communication modes. When using noise level as the criterion for judging whether to switch between communication modes, an average value of noise level shift is obtained from an initial value of noise level per unit frequency for each communication mode and previous and present measurements, and further, an average value of relative noise level shift is obtained from the difference between the average value of noise level shift and a reference noise value, and these obtained values are stored in the measurement data table. Then, the average values of relative noise level shift for the respective communication modes are compared, and the communication mode having the lowest average value of relative noise level is selected.

In the first calculation of the average value of relative noise level shift, since there are no previous measurements of the noise level, the average value of relative noise level shift is obtained from the difference between an initial noise level value and a reference noise value. In the calculations that follow, since the measurements of the noise level are inputted one after another, the average values of noise level shift are obtained from a plurality of previous noise level measurements and the average values of relative noise level shift are calculated from the differences between these average values of noise level shift and the reference noise value. Thus, the average values of relative noise level shift such as those shown in the measurement data table in FIG. 14 may be obtained.

By thus comparing the average values of relative noise level shift for the respective communication modes recorded in the measurement data table, the communication mode having the lowest average value of relative noise level shift is selected. In the example shown in FIG. 14, since the communication mode of "wireless LAN 12 Mbps" has the lowest average value of relative noise level shift at −2 dB, the communication mode of "wireless LAN 12 Mbps" is selected.

Next, a processing flow for switching the communication mode in accordance with the average value of relative noise level shift will be explained below with a flow chart. When switching the communication mode based on the average value of relative noise level shift, "throughput" should simply be read "noise level" in the flow chart of FIG. 13 where throughput is taken as the criterion for judging whether to switch communication modes.

The operation for switching communication modes will be explained below with reference to FIG. 13 where "throughput" is read "noise level." First, an initial value of the communication mode is set (step S100). In other words, an initial value of the noise level corresponding to each communication mode is stored in the measurement data table shown in FIG. 14. Then, a switching period of the communication mode is set (step S101). Switching to the optimum communication mode is performed at intervals of this switching period. At this point, a timer for counting this switching period is started (step S102).

Next, in order to find the communication quality level of the present communication mode, the noise level per unit frequency is measured (step S103). Then, an average value of noise level shift is obtained from a plurality of previous noise level measurements including the presently taken noise level measurement, and an average value of relative noise level shift is obtained from the difference between this average value of noise level shift and a reference noise value (step S104). Next, the obtained average value of relative noise level shift is stored at a position in the measurement data table corresponding to the relevant communication mode (step S105).

Then, it is judged whether or not the value of the timer has reached the time of the communication mode switching period (value of timer≧communication mode switching period?) (step S106). If the value of the timer has not reached the time of the communication mode switching period (step S106 is not satisfied), the process returns to step S102, and the average value of relative noise level shift is obtained on the basis of a plurality of immediately preceding noise level measurements while performing communication until the value of the timer reaches the time of the communication mode switching period. The obtained average value of relative noise level shift is stored in the measurement data table each time (steps S102 to S105).

On the other hand, in step S106, if the value of the timer has reached the time of the communication mode switching period (step S106 is satisfied), the average values of relative noise level shift of the respective communication modes stored in the measurement data table are compared (step S107). Then, the communication mode having the lowest average value of relative noise level shift is selected (step S108). Thereafter, the process returns to step S102, and a switching of the communication mode is performed by selecting the optimum communication mode based on the average values of relative noise level shift at intervals of the switching period set by the timer.

<Delay Profile>

Figure 15:
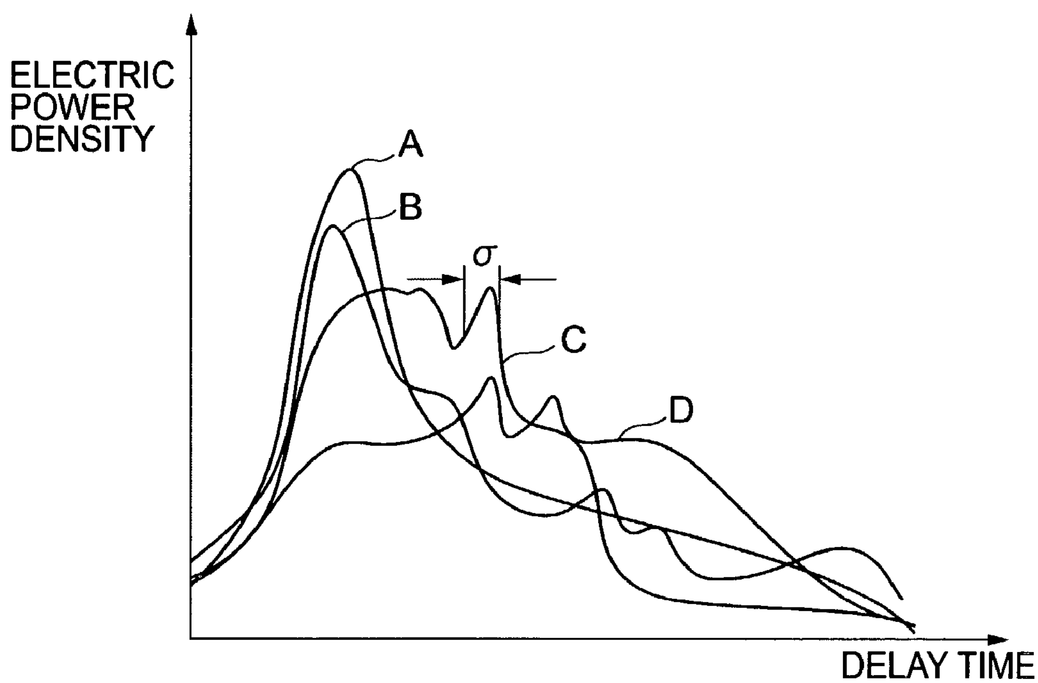
FIG. 15 is an example of a delay profile indicating an electric power density distribution on a time axis of a received delay waveform.

Next, an operation in which delay profile is used as a criterion for judging whether to switch communication modes will be explained below. Delay profile refers to an electric power density distribution of a received delay waveform on a time axis. FIG. 15 is an example of a delay profile showing the electric power density distribution of a received delay waveform of each communication mode of A, B, C and D on a time axis. As the delay profile, for example, the electric power density distribution of the received delay waveform when electric power is propagated from one point to another is extracted as a standard deviation σ on the time axis. As shown in FIG. 15, the electric power density distribution is different for each communication mode. In each communication mode, the standard deviation σ of the delay time of the received delay waveform (hereinafter, referred to as delay spread) is used as the criterion for judging whether to switch communication modes. In addition, delay spread is expressed in nsecs.

FIG. 16 is an example of a measurement data table where delay profile is used as the criterion for judging whether to switch communication modes. In using the standard deviation σ of the delay time on the time axis of the delay profile, the difference between an average value of delay spread shift obtained by averaging some previous and present delay spread measurements of the respective communication modes and a reference delay spread value, in other words, an average value of relative delay spread shift is stored in the measurement data table. Then, the judging unit 104 compares the average values of relative delay spread shift of the respective communication modes, and selects the communication mode having the lowest average value of relative delay spread shift.

In the first calculation of the average values of relative delay spread shift, since there is no previous measurement of delay spread, the average value of relative delay spread shift is obtained from the difference between an initial value of delay spread and the reference delay spread. In subsequent calculations, since measurement values of the delay spread are inputted one after another, by obtaining the average values of delay spread shift from a plurality of previous delay spread measurements, the average values of relative delay spread shift are obtained from the differences between these average values of delay spread shift and the reference delay spread. In the example of FIG. 16, when the average values of relative delay spread of the respective communication modes thus obtained are compared, since the communication mode of "electric power line 12 Mbps" has the lowest average value of relative delay spread shift at 1.3 nsec, the communication mode of "electric power line 12 Mbps" is selected as the optimum communication mode.

Next, a flow of processing for switching communication modes in accordance with the average value of relative delay spread shift will be explained below with reference to a flow chart. In switching communication modes in accordance with the average value of relative delay spread shift, the term "throughput" in the flow chart of FIG. 13 where the communication mode is switched using throughput as the criterion for judging the communication quality level should be read "delay spread."

With reference to FIG. 13, the operation for switching communication modes will be explained while throughput is read delay spread. An initial value of each communication mode is set (step S100). In other words, an initial value of delay spread corresponding to each communication mode is stored in the measurement data table shown in FIG. 16. Then, a switching period of the communication mode is set (step S101). Switching to the optimum communication mode is performed at intervals of this switching period. At this point, a timer for counting this switching period is started (step S102).

Then, in order to find the communication quality level of the present communication mode, the delay spread, which is a standard deviation σ of delay time in the received delay waveform is measured (step S103). Then, the average value of delay spread shift is obtained from a plurality of previous delay spread measurements including the present delay spread measurement just taken, and the average value of relative delay spread shift is obtained from the difference between the average value of delay spread shift and the reference delay spread (step S104). The obtained average value of relative delay spread shift is stored in a position of the measurement data table corresponding to the relevant communication mode (step S105).

Then, it is judged whether or not the value of the timer has reached the time of the communication mode switching period (value of timer≧communication mode switching period?) (step S106). If the value of the timer has not reached the time of the communication mode switching period (step S106 is not satisfied), the process returns to step S102, and the average value of relative delay spread shift is obtained on the basis of a plurality of previous relative delay spread measurements while continuing communication until the value of the timer reaches the time of the communication mode switching period. The obtained average value of relative delay spread shift is stored in the measurement data table (steps S102 to S105).

On the other hand, in step S106, if the value of the timer has reached the time of the communication mode switching period (step S106 is satisfied), the average values of relative delay spread shift of the respective communication modes stored in the measurement data table are compared (step S107), and the communication mode having the lowest average value of relative delay spread shift is selected (step S108). Thereafter, the process returns to step S102, and a switching to the optimum communication mode is performed at intervals of the switching period set by the timer and on the basis of the average value of relative delay spread shift.

<Dip Level>

Figure 17:
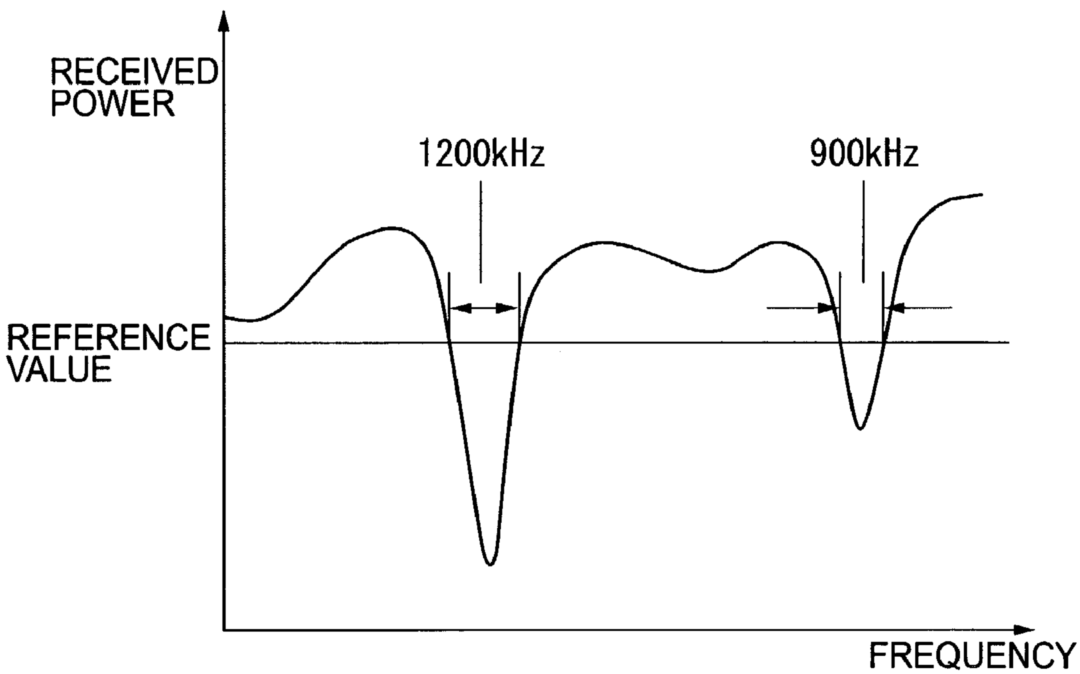
FIG. 17 is a diagram indicating electric power dip points on a frequency axis of a received signal.

Next, an operation where the dip level of a received signal is used as a criterion for judging whether to switch communication modes will be explained below. The dip level is a quantity calculated from a dip point. Here, the term dip point refers to a part where the reception power of a received signal falls below a certain level (i.e., a reference value) on a frequency axis. FIG. 17 is a diagram showing electric power dip points on a frequency axis of a received signal. In FIG. 17, parts at which the received power of the received signal falls below the reference value across at least a predetermined frequency width are shown as dip points. In using the dip level on the frequency axis as the criterion for judging whether to switch communication modes, an average value of dip point shift is obtained from previous and present measurements of the dip point on the frequency axis of the received power of each communication mode, and the average value of dip point shift is stored in a measurement data table as the dip level. Then, the communication mode having the lowest dip level is selected as the optimum communication mode by comparing the dip levels (in other words, the average shift values of the dip points) in the measurement data table.

As shown in FIG. 17, it is possible to obtain the dip level of the received power of the received signal on the frequency axis, for example, by (1) the number of dip points at which the received power level falls below a predetermined reference value across at least a predetermined frequency width, (2) the total value of the frequency widths of dip points at which the received power level falls below a predetermined reference value, (3) the number of the dip points at which the received power falls below the highest received power across at least a predetermined frequency width and (4) the total value of the frequency widths of dip points at which the received power falls below the highest received power across at least a predetermined frequency width, and so forth.

FIG. 18 is an example of a measurement data table where dip level on a frequency axis is used as a criterion for judging whether to switch between communication modes. In this measurement data table, for each communication mode, the dip level, the reference value (dBm) of the received power level and a frequency width (KHz) across which the received power level fell below the reference value are recorded. In this case, for the dip level, (1) the number of dip points, as described above, at which the received power level falls below the predetermined reference value across at least a predetermined frequency width is used. For example, with respect to the communication mode of "wireless LAN 6 Mbps," the fact that the number of dip points at which the received power level falls below the reference value level of −87 dBm across a frequency width of 200 KHz or wider is four is shown as the dip level. The communication mode having the lowest number of dip points, in other words, the lowest dip level, is selected as the optimum communication mode. According to the example shown in FIG. 18, the communication mode of "wireless LAN 18 Mbps" has the lowest dip level with 0 dip points, and thus, this communication mode of "wireless LAN 18 Mbps" is selected as the optimum communication mode.

Figure 19:
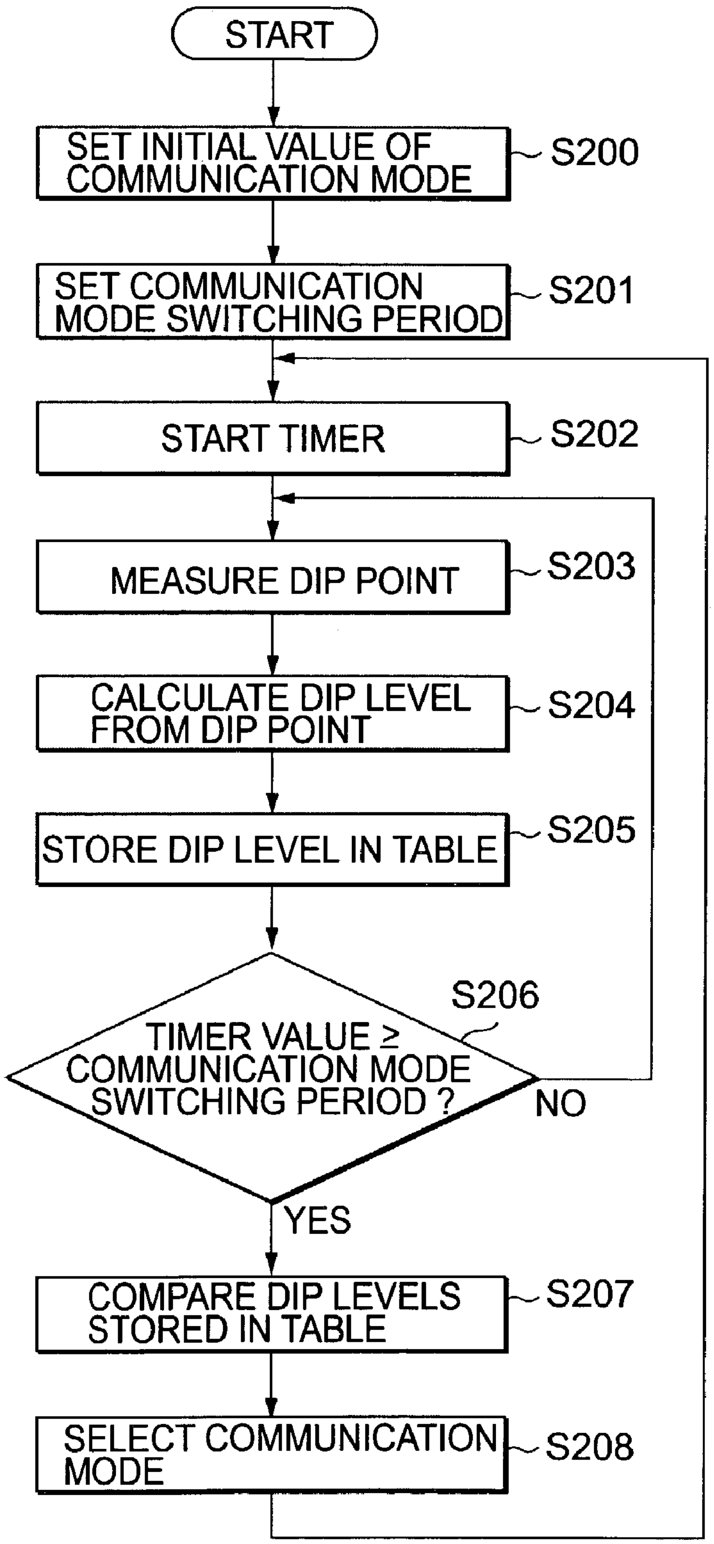
FIG. 19 is a flow chart indicating the operation for switching communication modes using dip level as a criterion for judging the communication quality level.

Next, a flow of operation in which the communication mode is switched in accordance with the dip level on the frequency axis will be explained below with reference to a flow chart. FIG. 19 is a flow chart showing the operation for switching communication modes with the dip level on a frequency axis as the criterion for judging the communication quality level. According to the flow chart shown in FIG. 19, first, an initial value of each communication mode is set (step S200). In other words, the initial value of dip level corresponding to each communication mode is stored in the measurement data table shown in FIG. 18. Then, a switching period for the communication modes is set (step S201). At intervals of this switching period, the communication mode is switched to the optimum communication mode. At this point, a timer for counting this switching period is started (step S202).

Then, in order to find the communication quality level of the present communication mode, a dip point, at which the received power level falls below the predetermined reference value across at least a predetermined frequency width, is measured (step S203). Then, the dip level is calculated from the measured dip point (step S204), and the obtained dip level is stored in a position corresponding to the relevant communication mode in the measurement data table (step S205).

Then, it is judged whether or not the value of the timer has reached the time of the communication mode switching period (value of timer≧communication mode switching period?) (step S206). If the value of the timer has not reached the time of the communication mode switching period (step S206 is not satisfied), the process returns to step S202, the dip points are measured until the value of the timer reaches the communication mode switching period, and the dip levels calculated from the dip points are stored in positions corresponding to the respective communication modes in the measurement data table (steps S202 to S205).

On the other hand, if, in step S206, the value of the timer has reached the time of the communication mode switching period (step S206 is satisfied), the dip levels of the respective communication modes stored in the measurement data table are compared (step S207), and the communication mode having the lowest dip level is selected (step S208). Thereafter, the process returns to step S202, switches communication modes at intervals of the switching period set by the timer, and on the basis of dip levels.

<Packet Error Rate (PER)>

Next, an operation where packet error rate (PER) is used as a criterion for judging whether to switch communication modes will be explained below. PER refers to the ratio of packets that fail in transmission to the total transmitted packets. FIG. 20 is an example of a measurement data table where PER is used as the criterion for judging whether to switch communication modes. In using PER as the criterion for judging whether to switch communication modes, a Average value of PER shift of each communication mode is calculated on the basis of previous and present measurements of PER, and the Average value of PER shift is stored in the measurement data table for each communication mode. Then, the average values of PER shift recorded in the measurement data table are compared, and the communication mode having the lowest Average value of PER shift is selected. In addition, if the previous measurements have not reached a predetermined number, the Average value of PER shift is calculated using the initial value of PER as described above with respect to the other measures of communication quality level.

Next, a flow of operation for switching the communication mode in accordance with the PER will be explained below with reference to a flow chart. When switching the communication mode in accordance with the PER, the term throughput in the flow chart of FIG. 13, in which the communication mode is switched with throughput as the criterion for judging the communication quality, need only be read PER.

With reference to FIG. 13, the operation for switching communication modes will be explained below while reading throughput as PER. First, an initial value of the communication mode is set (step S100). In other words, an initial value of the PER corresponding to each communication mode is stored in the measurement data table shown in FIG. 20. Then, a switching period of the communication modes is set (step S101). The communication mode is switched to the optimum communication mode at intervals of this switching period. At this point, a timer for counting this switching period is started (step S102).

Next, in order to find the communication quality level of the present communication mode, the PER indicating the transmission failure rate of packets is measured (step S103). Then, on the basis of previous and present measurements of the PER for each communication mode, the Average value of PER shift is calculated (step S104) and this Average value of PER shift is stored in the measurement data table for each communication mode (step S105).

Then, it is judged whether or not the value of the timer has reached the time of the communication mode switching period (value of timer≧communication mode switching period?) (step S106). If the value of the timer has not reached the time of the communication mode switching period (step S106 is not satisfied), the process returns to step S102, and the PER is measured until the value of the timer reaches the time of the communication mode switching period to calculate the Average value of PER shift. Then, the average value of PER shift is stored in a position corresponding to the relevant communication mode in the measurement data table (steps S102 to S105).

On the other hand if, in step S106, the value of the timer has reached the time of the communication mode switching period (step S106 is satisfied), the average values of PER shift stored in the measurement data table are compared (step S107). Then, the communication mode having the lowest average value of PER shift is selected (step S108). Thereafter, the process returns to step S102, the communication mode is switched based on the average values of PER shift at intervals of the switching period set by the timer.

<Bit Error Rate (BER)>

Next, an operation in which bit error rate (BER) is used as a criterion for judging whether to switch communication modes will be explained below. BER refers to the ratio of bit errors to transmitted data. FIG. 21 is an example of a measurement data table where BER is used as the criterion for judging whether to switch communication modes. When BER is used as the criterion for judging whether to switch communication modes, an average value of BER shift is calculated on the basis of previous and present measurements of the BER of each communication mode, and the average value of BER shift is stored in the measurement data table for each communication mode. Then, the average values of BER shift recorded in the measurement data table are compared, and the communication mode having the lowest average value of BER shift is selected. In addition, if the number of previous measurements of the BER has not reached a predetermined number, the average value of BER shift is calculated using an initial value of BER as described above with respect to the other measures of communication quality level.

When using the BER as the criterion for judging whether to switch communication modes, since the optimum communication mode is selected on the basis of the ratio of bit errors to each of the transmitted data, as compared to the judging of the communication quality level based on the packet transmission error rate (PER) in the description above, it is possible to perform a more accurate judging of the communication quality. Since the flow of processing for switching the communication mode in accordance with the BER is the same as the flow for PER except for the fact that PER should be read BER, an explanation of the operation with reference to a flow chart shall be omitted.

Although previous and present measurement data and the time information on when the data were obtained are stored in the measurement data table of each of the communication quality levels mentioned above, these data are not shown. In addition, in the measurement data tables for throughput (FIG. 12), noise level (FIG. 14), delay profile (FIG. 16), PER (FIG. 20) and BER (FIG. 21), although the average shift values are used as the criterion for judging whether to switch communication modes, the measurement immediately before switching the communication mode may instead be used as the criterion for judging whether to switch, or the present measurement may be used as the criterion for judging whether to switch.

Embodiments for switching the communication mode to the optimum communication mode on the basis of various communication quality levels are described above, however, it is also possible to switch communication modes at the will of a user. For example, in using the pressing of a button as the criterion for judging whether to switch, it may constantly be recorded which of a plurality of buttons for specifying the respective communication modes has been pressed by the user, such that the communication mode corresponding the button pressed most recently is selected.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A communication system for communicating with a communication partner by selectively switching between a wireless communication system for communicating via a wireless line and a wired communication system for communicating via an electric power line for supplying electric power to a communication terminal, wherein said communication system detects communication qualities of said wireless communication system and said wired communication system, and switches to the communication system having a better communication quality.

2. The communication system according to claim 1, wherein said communication system detects a signal quality of said wireless communication system during communication via said wired communication system, and if the communication quality of said wireless communication system is at or above a predetermined level, said communication system switches from said wired communication system to said wireless communication system.

3. A communication terminal for communicating with a communication partner by selectively switching between a wireless communication system for communicating via a wireless line and a wired communication system for communicating by transmitting a signal via an electric power line for supplying electric power, comprising:

communication quality detecting means for detecting communication qualities of said wireless communication system and said wired communication system; and switch means for selectively switching between said wireless communication system and said wired communication system on the basis of a judgment result of said communication quality detecting means.

4. The communication terminal according to claim 3, further comprising:

untransmitted data transmitting means for judging whether or not there is untransmitted data in a process of switching between said wireless communication system and said wired communication system by said switch means, and transmitting the untransmitted data after communication system switching is complete if there is untransmitted data.

5. The communication terminal according to claim 3, wherein if said communication partner connected to said wireless communication system judges during communication via said wireless communication system that the communication quality of said wired communication system is good, said communication quality detecting means conducts a communication negotiation with said communication partner, and enables switching from said wireless communication system to said wired communication system.

6. The communication terminal according to claim 3, wherein if said communication partner connected to said wireless communication system judges during communication via said wireless communication system that the communication quality of said wired communication system is low, said communication quality detecting means selects a different wired communication system line in accordance with a predetermined routing rule, and switches from said wireless communication system to said wired communication system using said different wired communication system line.

7. The communication terminal according to claim 3, wherein when a communication failure occurs in said wireless communication system due to interference from another communication system, said communication terminal switches from said wireless communication system to said wired communication system by said electric power line.

8. The communication terminal according to claim 7, wherein if a communication failure occurs in said wireless communication system, said communication terminal switches from said wireless communication system to said wired communication system at or within a predetermined time.

9. The communication terminal according to claim 3, wherein said wireless communication system and said wired communication system are categorized into a plurality of communication modes having different data transmission rates, and a communication mode having the highest communication quality is selected from said plurality of communication modes.

10. The communication terminal according to claim 9, further comprising:

processing means for calculating an average value of throughput shift for each of said communication modes by measuring throughput, which is the data transmission amount per unit time, a plurality of times;

storage means for storing in a table said average value of throughput shift calculated by said processing means; and judging means for judging the highest average value of throughput shift by comparing said average value of throughput shift corresponding to each of said communication modes stored in said table of said storage means, wherein said wireless communication system includes a wireless processing unit, said wired communication system includes an electric power line carrier communication processing unit, and said judging means uses said average value of throughput shift as a criterion for judging the communication quality level, and a communication mode corresponding to said highest average value of throughput shift is selected.

11. The communication terminal according to claim 9, further comprising:

processing means for calculating an average value of relative noise level shift based on the difference between an average value of noise level shift obtained by averaging a plurality of measurements of noise level per unit frequency and a reference noise level;

storage means for storing in a table said average value of relative noise level shift calculated by said processing means; and judging means for judging the lowest average value of relative noise level shift by comparing said average value of relative noise level shift corresponding to each of said communication modes stored in said table of said storage means, wherein said wireless communication system includes a wireless processing unit, said wired communication system includes an electric power line carrier communication processing unit, and said judging means uses said average value of relative noise level shift as a criterion for judging the communication quality level, and a communication mode corresponding to said lowest average value of relative noise level shift is selected.

12. The communication terminal according to claim 9, further comprising:

processing means for calculating an average value of relative delay spread shift based on the difference between an average value of delay spread shift obtained by averaging a plurality of measurements of delay spread shift, which is a standardized deviation of a propagation electric power density distribution on a time axis, and a reference delay spread;

storage means for storing in a table said average value of relative delay spread shift calculated by said processing means; and judging means for judging the lowest average value of relative delay spread shift by comparing said average value of relative delay spread shift corresponding to each of said communication modes stored in said table of said storage means, wherein said wireless communication system includes a wireless processing unit, said wired communication system includes an electric power line carrier communication processing unit, and said judging means uses said average value of relative delay spread shift as a criterion for judging the communication quality level, and a communication mode corresponding to said lowest average value of delay spread shift is selected.

13. The communication terminal according to claim 9, further comprising:

processing means for calculating one of a number of dip points at which a received power falls below a predetermined power level across at least a predetermined frequency width and a total value of frequency widths of said dip points;

storage means for storing in a table said one of said number of dip points and said total value of frequency widths calculated by said processing means as a dip level; and judging means for judging the lowest dip level by comparing said dip level corresponding to each of said communication modes stored in said table of said storage means, wherein said wireless communication system includes a wireless processing unit, said wired communication system includes an electric power line carrier communication processing unit, and said judging means uses said dip level as a criterion for judging the communication quality level, and a communication mode corresponding to said lowest dip level is selected.

14. The communication terminal according to claim 9, further comprising:

processing means for calculating an average value of packet error rate shift for each of said communication modes based on a plurality of measurements of a packet error rate, which expresses a ratio of packets which fail in transmission to transmitted packets;

storage means for storing in a table said average value of packet error rate shift calculated by said processing means; and judging means for judging the lowest average value of packet error rate shift by comparing said average value of packet error rate shift corresponding to each of said communication modes stored in said table of said storage means, wherein said wireless communication system includes a wireless processing unit, said wired communication system includes an electric power line carrier communication processing unit, and said judging means uses said average value of packet error rate shift as a criterion for judging the communication quality level, and a communication mode corresponding to said lowest average value of packet error rate shift is selected.

15. A communication terminal according to claim 9, further comprising:

processing means for calculating an average value of bit error rate shift for each of said communication modes based on a plurality of measurements of a bit error rate, which expresses a ratio of a bit amount of data which fails in transmission to a bit amount of transmitted data;

storage means for storing in a table said average value of bit error rate shift calculated by said processing means; and judging means for judging the lowest average value of bit error rate shift by comparing said average value of bit error rate shift corresponding to each of said communication modes stored in said table of said storage means, wherein said wireless communication system includes a wireless processing unit, said wired communication system includes an electric power line carrier communication processing unit, and said judging means uses said average value of bit error rate shift as a criterion for judging the communication quality level, and a communication mode corresponding to said lowest average value of bit error rate shift is selected.

16. A communication method for communicating between a communication terminal and a communication partner by selectively switching between a wireless communication system for communicating by transmitting a radio signal via a wireless line and a wired communication system for communicating by transmitting a signal via an electric power line for supplying electric power to said communication terminal, comprising:

detecting a communication quality of each of said wireless communication system and said wired communication system; and selectively switching between said wireless communication system and said wired communication system on the basis of a judgment result of said detecting of the communication quality.

17. The communication method according to claim 16, further comprising:

judging whether or not there exists untransmitted data in the process of said selective switching of the communication system, and transmitting said untransmitted data when said switching of the communication system is complete if said untransmitted data exists.

18. The communication method according to claim 16, wherein if, during communication by said wireless communication system, it is judged that the communication quality of communication by said wired communication system between said communication partner is good in said detecting of the communication quality of each of said wireless and wired communication systems, in said selective switching of the communication system, said communication terminal conducts a communication negotiation with said communication partner to switch from said wireless communication system to said wired communication system.

19. The communication method according to claim 16, wherein in said detecting of the communication quality, if it is judged that the communication quality of communication by said wired communication system between said communication partner is bad, in said selective switching of the communication system, a wired communication system line by another electric power line is selected in accordance with a predetermined routing rule to switch from said wireless communication system to said wired communication system using said wired communication system line by said other electric power line.

20. The communication method according to claim 16, wherein when a communication failure occurs in said wireless communication system due to interference from another communication system, a switch to said wired communication system is performed in said selective switching of the communication system.

21. The communication method according to claim 16, wherein when a communication failure occurs in said wireless communication system, said wireless communication terminal is switched to said wired communication system within a predetermined time in said selective switching of the communication system.

22. The communication method according to claim 16, wherein said wireless communication system and said wired communication system are categorized into a plurality of communication modes having different data transmission rates, and a communication mode having the best communication quality is selected from said plurality of communication modes.

23. The communication method according to claim 22, further comprising:

calculating an average value of throughput shift for each of said communication modes by measuring throughput, which is the data transmission amount per unit time, a plurality of times;

storing said average value of throughput shift in a table;

judging a highest average value of throughput shift by comparing said average value of throughput shift corresponding to each of said plurality of communication modes stored in said table; and selecting a communication mode corresponding to said highest average value of throughput shift using said average value of throughput shift as a criterion for judging said communication quality level, wherein said wireless communication system comprises a wireless processing unit, and said wired communication system comprises an electric power line carrier communication processing unit.

24. The communication method according to claim 22, further comprising:

calculating an average value of relative noise level shift for each of said communication modes based on the difference between an average value of noise level shift obtained by averaging a plurality of measurements of noise level per unit frequency and a reference noise level;

storing said average value of relative noise level shift in a table;

judging a lowest average value of relative noise level shift by comparing said average value of relative noise level shift corresponding to each of said plurality of communication modes stored in said table; and selecting a communication mode corresponding to said lowest average value of relative noise level shift using said average value of relative noise level shift as a criterion for judging said communication quality level, wherein said wireless communication system comprises a wireless processing unit, and said wired communication system comprises an electric power line carrier communication processing unit.

25. The communication method according to claim 22, further comprising:

calculating an average value of relative delay spread shift for each of said communication modes based on the difference between an average value of delay spread shift obtained by averaging a plurality of measurements of delay spread, which is a standardized deviation of a propagation electric power density distribution on a time axis, and a reference spread shift;

storing said average value of relative delay spread shift in a table;

judging a lowest average value of relative delay spread shift by comparing said average value of relative delay spread shift corresponding to each of said plurality of communication modes stored in said table; and selecting a communication mode corresponding to said lowest average value of relative delay spread shift using said average value of relative delay spread shift as a criterion for judging said communication quality level, wherein said wireless communication system comprises a wireless processing unit, and said wired communication system comprises an electric power line carrier communication processing unit.

26. The communication method according to claim 22, further comprising:

calculating one of a number of dip points, at which a received power falls below a predetermined power level across at least a predetermined frequency width, and a total value of frequency widths of said dip points;

storing said one of said number of dip points and said total value of said frequency widths in a table as a dip level;

judging a lowest dip level by comparing said dip level corresponding to each of said plurality of communication modes stored in said table; and selecting a communication mode corresponding to said lowest dip level using said dip level as a criterion for judging said communication quality level, wherein said wireless communication system comprises a wireless processing unit, and said wired communication system comprises an electric power line carrier communication processing unit.

27. The communication method according to claim 22, further comprising:

calculating an average value of packet error rate shift for each of said communication modes based on a plurality of measurements of a packet error rate, which represents a ratio of packets that fail in transmission to transmitted packets;

storing said average value of packet error rate shift in a table;

judging a lowest average value of packet error rate shift by comparing said average value of packet error rate shift corresponding to each of said plurality of communication modes stored in said table; and selecting a communication mode corresponding to said lowest average value of packet error rate shift using said average value of packet error rate shift as a criterion for judging said communication quality level, wherein said wireless communication system comprises a wireless processing unit, and said wired communication system comprises an electric power line carrier communication processing unit.

28. The communication method according to claim 22, further comprising:

calculating an average value of bit error rate shift for each of said communication modes based on a plurality of measurements of a bit error rate, which represents a ratio of a bit amount of data that fails in transmission to a bit amount of transmitted data;

storing said average value of bit error rate shift in a table;

judging a lowest average value of bit error rate shift by comparing said average value of bit error rate shift corresponding to each of said plurality of communication modes stored in said table; and selecting a communication mode corresponding to said lowest average value of bit error rate shift using said average value of bit error rate shift as a criterion for judging said communication quality level, wherein said wireless communication system comprises a wireless processing unit, and said wired communication system comprises an electric power line carrier communication processing unit.

* * * * *